(12) United States Patent
Shinoda et al.

(10) Patent No.: US 11,353,021 B2
(45) Date of Patent: Jun. 7, 2022

(54) ROOTS PUMP HAVING A SEAL MEMBER WITH FIRST AND SECOND PROJECTIONS

(71) Applicants: KABUSHIKI KAISHA TOYOTA JIDOSHOKKI, Aichi-ken (JP); NOK CORPORATION, Tokyo (JP)

(72) Inventors: Fumiya Shinoda, Kariya (JP); Daisuke Masaki, Kariya (JP); Takayuki Hirano, Kariya (JP); Shintaro Kashiwa, Kariya (JP); Naoki Takani, Kariya (JP); Yohei Miki, Aso (JP)

(73) Assignees: KABUSHIKI KAISHA TOYOTA JIDOSHOKKI, Aichi-ken (JP); NOK CORPORATION, Tokyo (JP)

( * ) Notice: Subject to any disclaimer, the term of this patent is extended or adjusted under 35 U.S.C. 154(b) by 0 days.

(21) Appl. No.: 17/241,730

(22) Filed: Apr. 27, 2021

(65) Prior Publication Data
US 2021/0340979 A1    Nov. 4, 2021

(30) Foreign Application Priority Data
Apr. 30, 2020 (JP) .............................. JP2020-080539

(51) Int. Cl.
*F04C 2/12* (2006.01)
*F04C 15/00* (2006.01)
(Continued)

(52) U.S. Cl.
CPC .......... *F04C 2/126* (2013.01); *F04C 15/0019* (2013.01); *F04C 18/086* (2013.01);
(Continued)

(58) Field of Classification Search
CPC .................. F16J 15/061; F16J 15/0831; F04C 2/08–088; F04C 2/12–14; F04C 2/28;
(Continued)

(56) References Cited

U.S. PATENT DOCUMENTS

| 6,981,704 B2 * | 1/2006 | Okazaki | F16J 15/061 |
| | | | 277/649 |
| 2014/0175759 A1 * | 6/2014 | Nagata | F16J 15/106 |
| | | | 277/641 |

(Continued)

FOREIGN PATENT DOCUMENTS

| DE | 102016209449 A1 * | 11/2017 | ............ F16J 15/061 |
| JP | 2006-283664 A | 10/2006 | |
| JP | 2006283664 A * | 10/2006 | |

*Primary Examiner* — Laert Dounis
(74) *Attorney, Agent, or Firm* — Greenblum & Bernstein, P.L.C.

(57) ABSTRACT

A housing unit of a Roots pump includes a rotor housing, which includes a peripheral wall, and a cover member, which closes an opening of the rotor housing. At least one of a mating surface of the peripheral wall or a mating surface of the cover member includes an annular first groove accommodating a seal member. The rotor housing includes a bulging portion including a second groove. The seal member incudes first projections, which project from an annular seal body, and a second projection, which projects further radially inward from the seal body than the first projections. Each first projection includes a distal end that contacts a side surface on a radially inner side or on a radially outer side of the first groove. The second projection is arranged in the second groove to determine the position of the seal body in the first groove.

10 Claims, 8 Drawing Sheets

(51) Int. Cl.
    *F04C 18/12*     (2006.01)
    *F04C 18/08*     (2006.01)
    *F04C 27/00*     (2006.01)
    *F16J 15/06*     (2006.01)
    *F16J 15/02*     (2006.01)
    *F16J 15/08*     (2006.01)

(52) U.S. Cl.
    CPC .......... *F04C 18/126* (2013.01); *F04C 27/004* (2013.01); *F16J 15/022* (2013.01); *F16J 15/025* (2013.01); *F16J 15/061* (2013.01); *F16J 15/0831* (2013.01); *F04C 2240/30* (2013.01)

(58) Field of Classification Search
    CPC ........ F04C 18/08–088; F04C 18/12–14; F04C 15/0003–0038; F04C 27/00–02; F01C 1/08–088; F01C 1/12–14; F01C 19/00–125
    See application file for complete search history.

(56) References Cited

U.S. PATENT DOCUMENTS

2015/0362074 A1*  12/2015  Seki ....................... F16J 15/441
                                                                         277/512
2020/0208635 A1*  7/2020  Shinoda ................ F16J 15/022

* cited by examiner

ROOTS PUMP HAVING A SEAL MEMBER WITH FIRST AND SECOND PROJECTIONS

BACKGROUND

1. Field

The present disclosure relates to a Roots pump.

2. Description of Related Art

For example, Japanese Laid-Open Patent Publication No. 2006-283664 discloses a Roots pump that includes a rotary shaft rotated by a drive source, a drive rotor driven by the rotary shaft, and a driven rotor driven in association with the drive rotor. The Roots pump also includes a housing unit having a rotor housing and a cover member. The rotor housing includes an end wall, through which the rotary shaft extends, and a peripheral wall, which extends from the outer periphery of the end wall. The cover member closes an opening of the rotor housing. The rotor housing accommodates the drive rotor and the driven rotor. The peripheral wall and the cover member include mating surfaces, which abut on each other. At least one of the mating surfaces include a loop-shaped first groove. The first groove accommodates a seal member, which seals the inside of the housing unit from the outside of the housing unit.

When a vehicle equipped with the Roots pump is traveling, for example, in the vicinity of seashore, the housing unit may be exposed to salt water. In such a case, the seal member prevents entry of salt water into the housing unit through the gap between the peripheral wall and the cover member. However, if the gap between the radially outer-side surface of the first groove and the seal member is large, salt water is likely to collect in the gap. When the salt concentration of the salt water collected in the gap increases, the salt water can corrode portions of the housing unit that contact the salt water or portions of the seal member that contact the salt water.

A fuel cell vehicle has a fuel cell system that supplies oxygen and hydrogen to a fuel cell to generate power. For example, the Roots pump disclosed in the above-described publication is used as a pump that supplies hydrogen to the fuel cell. The Roots pump draws in hydrogen that did not react with oxygen in the fuel cell. The hydrogen contains water generated during power generation in the fuel cell. The seal member prevents leakage of hydrogen containing the generated water to the outside of the housing unit from the inside of the housing unit through the gap between the peripheral wall and the cover member. However, if the gap between the radially inner-side surface of the first groove and the seal member is large, the hydrogen containing the generated water is likely to collect in the gap. The generated water contained in the hydrogen collected in the gap can corrode portions of the housing unit that contact the generated water or portions of the seal member that contact the generated water.

In some cases, the shape of the first groove is not a true circular loop, but an elliptic loop or a rectangular loop, and the seal member, which is accommodated in the first groove, is formed to have a shape of an elliptic loop or a rectangular loop in correspondence with the shape of the first groove. In this case, if the seal member is accommodated with its position in the circumferential direction displaced in relation to the first groove, gaps may be created between the side surfaces of the first groove and the seal member. The salt water or the generated water, which have discussed above, may collect in such a gap, degrading the corrosion resistance of the housing unit or the seal member. Also, since there is a great demand for size reduction in Roots pumps, the corrosion resistance is desired to be increased without increasing the size.

An objective of the present disclosure is to provide a Roots pump that is capable of improving the corrosion resistance without increasing the size.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A Roots pump according to one aspect of the present disclosure includes a rotary shaft that is rotated by a drive source, a drive rotor that is driven by the rotary shaft, a driven rotor that is driven in association with the drive rotor, and a housing unit. The housing unit includes a rotor housing, which accommodates the drive rotor and the driven rotor, and a cover member, which closes an opening of the rotor housing. The rotor housing includes an end wall, through which the rotary shaft extends, and a peripheral wall, which extends from an outer periphery of the end wall. The Roots pump also includes a seal member, which is arranged between the rotor housing and the cover member. The peripheral wall includes a mating surface that faces the cover member, and the cover member includes a mating surface that faces the peripheral wall. At least one of the mating surfaces includes an annular first groove. The first groove includes a side surface on a radially inner side and a side surface on a radially outer side, and the side surfaces face each other. The seal member is accommodated in the first groove. The rotor housing includes a bulging portion, which is a part of the peripheral wall that bulges radially inward at a position between the drive rotor and the driven rotor. The bulging portion includes a mating surface that faces the cover member and a second groove, which is connected to the side surface on the radially inner side of the first groove. The seal member includes an annular seal body, first projections, which project from the seal body toward one of the side surface on the radially inner side or the side surface on the radially outer side of the first groove, the first projections being arranged at intervals in a circumferential direction of the seal body, and a second projection, which projects further radially inward from the seal body than the first projections. Each first projection includes a distal end that contacts one of the side surface on the radially inner side or the side surface on the radially outer side of the first groove. The second projection is arranged in the second groove so as to determine a position of the seal body in the first groove.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A Roots pump 10 according to an embodiment will now be described with reference to FIGS. 1 to 13. The Roots pump 10 of the present embodiment is mounted on a fuel cell vehicle. The fuel cell vehicle has a fuel cell system that supplies oxygen and hydrogen to a fuel cell to generate power. The Roots pump 10 is used as a hydrogen pump for the fuel cell vehicle. Specifically, the Roots pump 10 circulates hydrogen (hydrogen off-gas), which is fluid discharged from the fuel cell, back to the fuel cell.

Figure 1:
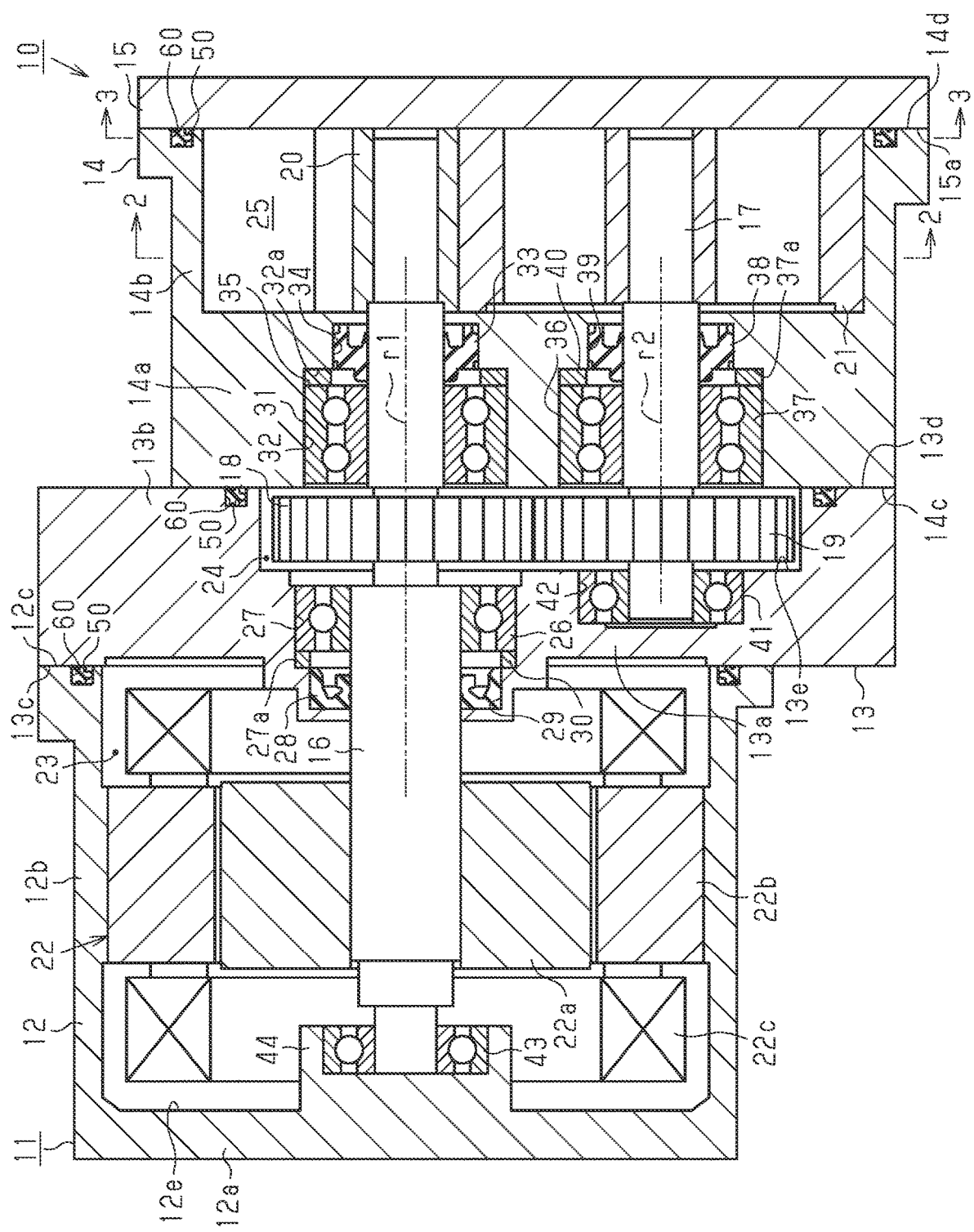
FIG. 1 is a cross-sectional plan view illustrating a Roots pump according to an embodiment.

As shown in FIG. 1, the Roots pump 10 includes a housing unit 11, which includes a motor housing 12, a gear housing 13, a rotor housing 14, and a cover member 15. The motor housing 12 has a plate-shaped end wall 12a and a peripheral wall 12b, which extends from the outer periphery of the end wall 12a. The gear housing 13 has a plate-shaped end wall 13a and a peripheral wall 13b, which extends from the outer periphery of the end wall 13a. The peripheral walls 12b, 13b are tubular. The term "tubular" as used in this description does not only refer to a structure with a circular cross section, but may also refer to a structure with any non-circular cross section such as an elliptic cross section and a rectangular cross section.

The gear housing 13 is coupled to an open end of the peripheral wall 12b of the motor housing 12. An outer surface 13c of the end wall 13a of the gear housing 13 abuts on an opening end face 12c of the peripheral wall 12b of the motor housing 12. The end wall 13a of the gear housing 13 closes the opening of the peripheral wall 12b of the motor housing 12. The axial direction of the peripheral wall 12b of the motor housing 12 agrees with the axial direction of the peripheral wall 13b of the gear housing 13.

The rotor housing 14 has a plate-shaped end wall 14a and a peripheral wall 14b, which extends from the outer periphery of the end wall 14a. The peripheral wall 14b of the rotor housing 14 of the present embodiment is tubular, and more specifically, has an elliptic cross section. The rotor housing 14 is coupled to an open end of the peripheral wall 13b of the gear housing 13. An outer surface 14c of the end wall 14a of the rotor housing 14 abuts on an opening end face 13d of the peripheral wall 13b of the gear housing 13. The end wall 14a of the rotor housing 14 closes the opening of the peripheral wall 13b of the gear housing 13. The axial direction of the peripheral wall 13b of the gear housing 13 agrees with the axial direction of the peripheral wall 14b of the rotor housing 14.

The cover member 15 is plate-shaped. The cover member 15 of the present embodiment is elliptic in a plan view. The cover member 15 is coupled to an open end of the peripheral wall 14b of the rotor housing 14. An end face 15a of the cover member 15 abuts an opening end face 14d of the peripheral wall 14b of the rotor housing 14. The cover member 15 is coupled to the rotor housing 14 while closing the opening of the peripheral wall 14b of the rotor housing 14.

The Roots pump 10 includes a drive shaft 16 and a driven shaft 17, which are rotationally supported by the housing unit 11 while being arranged parallel with each other. A rotation axis r1 of the drive shaft 16 and a rotation axis r2 of the driven shaft 17 extend in the axial direction of the peripheral walls 12b, 13b, and 14b. A disc-shaped drive gear 18 is fixed to the drive shaft 16. A disc-shaped driven gear 19, which meshes with the drive gear 18, is fixed to the driven shaft 17. The drive shaft 16 is provided with a drive rotor 20. The driven shaft 17 is provided with a driven rotor 21, which meshes with the drive rotor 20.

The Roots pump 10 includes an electric motor 22, which rotates the drive shaft 16. The drive shaft 16 is thus a rotary shaft that is rotated by the electric motor 22, which is a drive source. The electric motor 22 is accommodated in a motor chamber 23, which is formed in the housing unit 11. The motor chamber 23 is defined by the end wall 12a of the motor housing 12, the peripheral wall 12b of the motor housing 12, and the end wall 13a of the gear housing 13. The electric motor 22 includes a motor rotor 22a and a stator 22b. The motor rotor 22a is fixed to the drive shaft 16 so as to rotate integrally with the drive shaft 16. The stator 22b is fixed to the inner circumferential surface of the peripheral wall 12b of the motor housing 12 and surrounds the motor rotor 22a. The motor rotor 22a and the stator 22b are tubular, and more specifically, have circular cross sections. The stator 22b includes a coil 22c, which is wound about teeth (not shown). When power is supplied to the coil 22c, the electric motor 22 is activated so that the motor rotor 22a rotates integrally with the drive shaft 16.

The housing unit 11 includes a gear chamber 24, which accommodates the drive gear 18 and the driven gear 19. The gear chamber 24 is defined by the end wall 13a of the gear housing 13, the peripheral wall 13b of the gear housing 13, and the end wall 14a of the rotor housing 14. The drive gear 18 and the driven gear 19 are accommodated in the gear chamber 24 while meshing with each other. Oil is sealed in the gear chamber 24. The oil contributes to lubrication of the drive gear 18 and the driven gear 19 and suppression of temperature increase. The drive gear 18 and the driven gear 19 rotate while being put in the oil so as to be allowed to rotate at high speeds without seizing or wearing.

The housing unit 11 includes a rotor chamber 25, which accommodates the drive rotor 20 and the driven rotor 21 meshing with each other. The rotor chamber 25 is defined by the end wall 14a of the rotor housing 14, the peripheral wall 14b of the rotor housing 14, and the cover member 15. The rotor housing 14 thus accommodates the drive rotor 20 and the driven rotor 21. The drive rotor 20 and the driven rotor 21 are accommodated in the rotor chamber 25 while meshing with each other. In the present embodiment, the motor chamber 23, the gear chamber 24, and the rotor chamber 25 are arranged in that order in a direction along the rotation axis r1 of the drive shaft 16.

The end wall 13a of the gear housing 13 separates the gear chamber 24 and the motor chamber 23 from each other in the direction along the rotation axis r1 of the drive shaft 16. The end wall 14a of the rotor housing 14 separates the gear chamber 24 and the rotor chamber 25 from each other in the direction along the rotation axis r1 of the drive shaft 16. The cover member 15 separates the rotor chamber 25 from the outside in the direction along the rotation axis r1 of the drive shaft 16.

The drive shaft 16 extends through the end wall 13a of the gear housing 13 and the end wall 14a of the rotor housing 14. The driven shaft 17 extends through the end wall 14a of the rotor housing 14. An inner surface 13e of the end wall 13a of the gear housing 13 forms a first wall surface of the gear chamber 24. The outer surface 14c of the end wall 14a of the rotor housing 14 forms a second wall surface of the gear chamber 24 that is opposed to the first wall surface. The first wall surface is closer to the motor chamber 23 than the second wall surface in a direction along the rotation axis r1 of the drive shaft 16 or the rotation axis r2 of the driven shaft 17.

A first bearing accommodating recess 27 is formed in the inner surface 13e of the end wall 13a of the gear housing 13. The first bearing accommodating recess 27 is circular hole-shaped and accommodates a first bearing 26. The drive shaft 16 extends through the first bearing accommodating recess 27 and is rotationally supported by the first bearing 26. A first seal accommodating recess 29 is formed in a bottom surface 27a of the first bearing accommodating recess 27. The first seal accommodating recess 29 is circular hole-shaped and accommodates an annular first seal member 28. The drive shaft 16 extends through the first seal accommodating recess 29. The first seal member 28 disconnects the gear chamber 24 and the motor chamber 23 from each other. The first seal accommodating recess 29 is continuous with the first bearing accommodating recess 27. An annular first spacer 30 is arranged between the first bearing 26 and the bottom surface 27a of the first bearing accommodating recess 27 in the direction along the rotation axis r1 of the drive shaft 16.

The term "annular" as used in this description may refer to any structure that forms a loop, which is a continuous shape with no ends. "Annular" shapes include but are not limited to a circular shape, an elliptic shape, and a polygonal shape with sharp or rounded corners.

A second bearing accommodating recess 32 is formed in the outer surface 14c of the end wall 14a of the rotor housing 14. The second bearing accommodating recess 32 is circular hole-shaped and accommodates a second bearing 31. The drive shaft 16 extends through the second bearing accommodating recess 32 and is rotationally supported by the second bearing 31. The drive shaft 16 thus extends through the end wall 14a of the rotor housing 14. A second seal accommodating recess 34 is formed in a bottom surface 32a of the second bearing accommodating recess 32. The second bearing accommodating recess 32 is circular hole-shaped and accommodates an annular second seal member 33. The drive shaft 16 extends through the second seal accommodating recess 34. The second seal member 33 disconnects the gear chamber 24 and the rotor chamber 25 from each other. The second seal accommodating recess 34 is continuous with the second bearing accommodating recess 32. An annular second spacer 35 is arranged between the second bearing 31 and the bottom surface 32a of the second bearing accommodating recess 32 in the direction along the rotation axis r1 of the drive shaft 16.

Also, a third bearing accommodating recess 37 is formed in the outer surface 14c of the end wall 14a of the rotor housing 14. The third bearing accommodating recess 37 is circular hole-shaped and accommodates a third bearing 36. The driven shaft 17 extends through the third bearing accommodating recess 37 and is rotationally supported by the third bearing 36. A third seal accommodating recess 39 is formed in a bottom surface 37a of the third bearing accommodating recess 37. The third seal accommodating recess 39 is circular hole-shaped and accommodates an annular third seal member 38. The driven shaft 17 extends through the third seal accommodating recess 39. The third seal member 38 disconnects the gear chamber 24 and the rotor chamber 25 from each other. The third seal accommodating recess 39 is continuous with the third bearing accommodating recess 37. An annular third spacer 40 is arranged between the third bearing 36 and the bottom surface 37a of the third bearing accommodating recess 37 in the direction along the rotation axis r2 of the driven shaft 17.

A fourth bearing accommodating recess 42 is formed in the inner surface 13e of the end wall 13a of the gear housing 13. The fourth bearing accommodating recess 42 is circular hole-shaped and accommodates a fourth bearing 41. The driven shaft 17 has a first end, which is arranged in the fourth bearing accommodating recess 42 and is rotationally supported by the fourth bearing 41. The driven shaft 17 extends through the third bearing accommodating recess 37 and the third seal accommodating recess 39. The driven shaft 17 has a second end, which protrudes into the rotor chamber 25. The driven rotor 21 is attached to the second end of the driven shaft 17. The second end of the driven shaft 17 is a free end. The driven shaft 17 is thus supported in a cantilever-like manner by the housing unit 11.

A bearing portion 44 is formed in an inner surface 12e of the end wall 12a of the motor housing 12. The bearing portion 44 accommodates a fifth bearing 43. The bearing portion 44 is tubular and has a circular cross section. The drive shaft 16 has a first end, which is arranged in the bearing portion 44 and is rotationally supported by the fifth bearing 43. The drive shaft 16 extends through the first seal accommodating recess 29, the first bearing accommodating recess 27, the gear chamber 24, the second bearing accommodating recess 32, and the second seal accommodating recess 34. The drive shaft 16 has a second end, which protrudes into the rotor chamber 25. The drive rotor 20 is attached to the second end of the drive shaft 16. The second end of the drive shaft 16 is a free end. The drive shaft 16 is thus supported in a cantilever-like manner by the housing unit 11.

Figure 2:
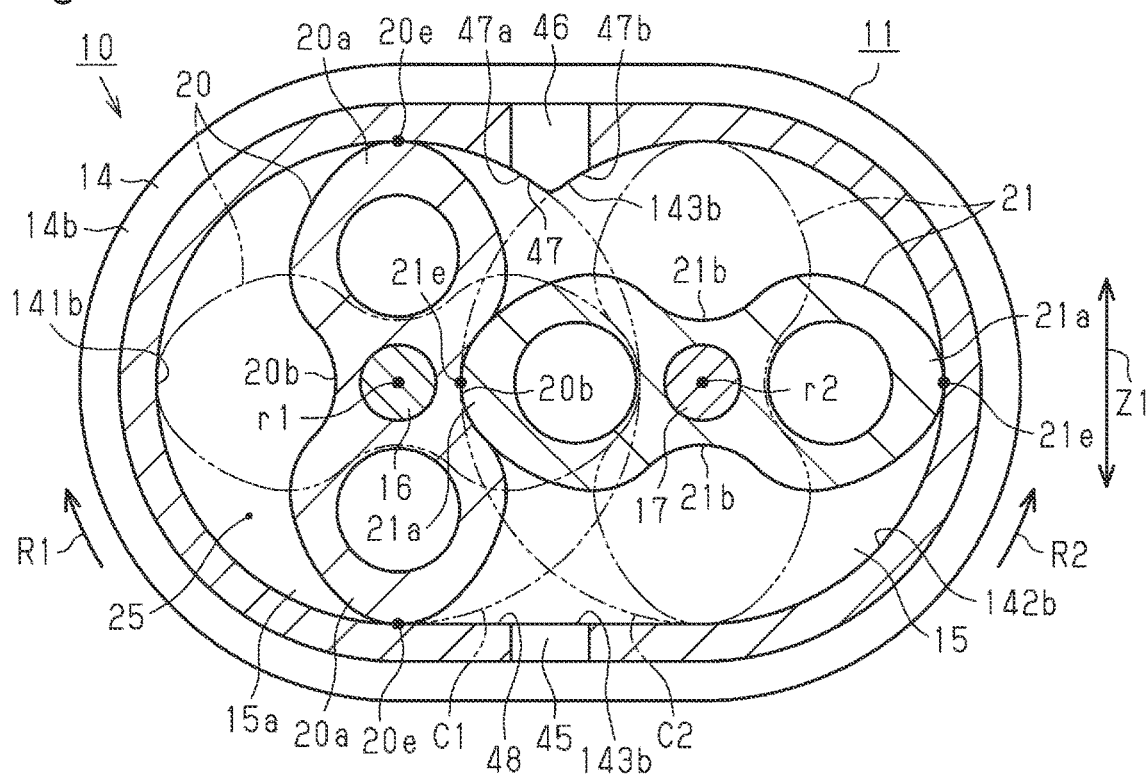
FIG. 2 is a cross-sectional view taken along line 2-2 of FIG. 1.
Figure 3:
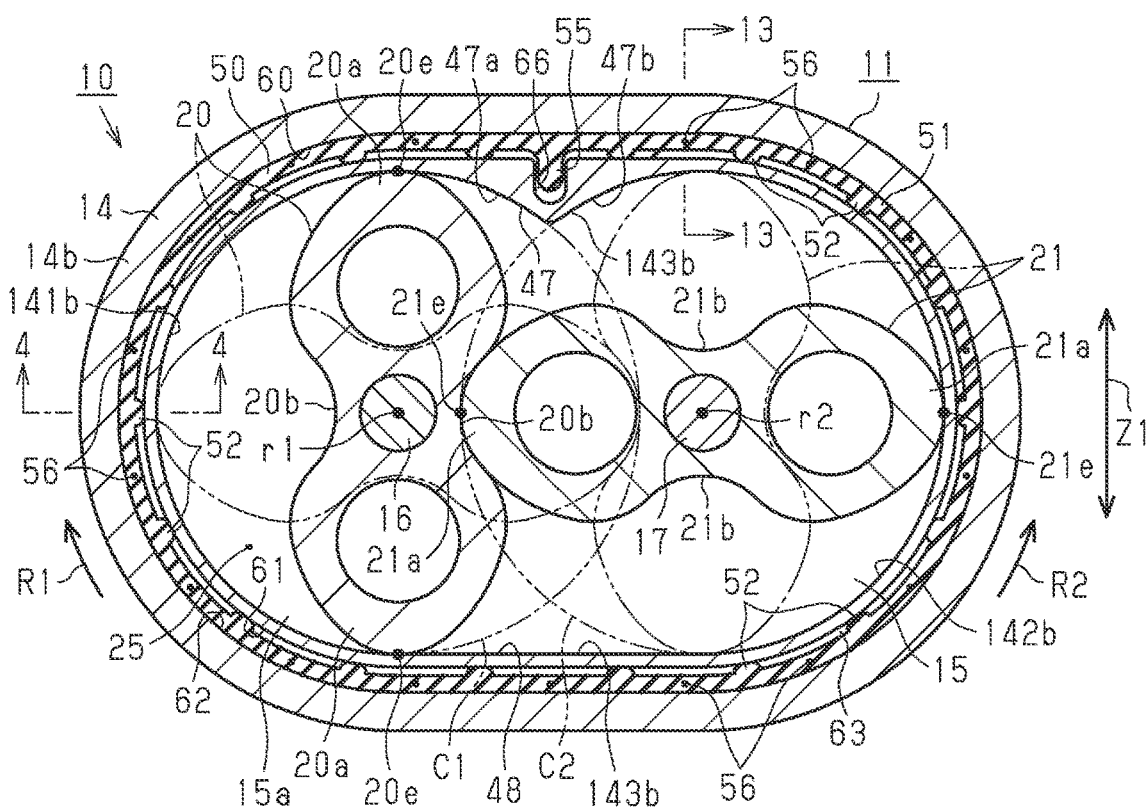
FIG. 3 is a cross-sectional view taken along line 3-3 of FIG. 1.

As shown in FIGS. 2 and 3, the drive rotor 20 and the driven rotor 21 are arranged to be adjacent to each other in the longitudinal direction of the peripheral wall 14b of the rotor housing 14 when viewed in the axial direction of the peripheral wall 14b. The rotation axis r1 of the drive shaft 16 and the rotation axis r2 of the driven shaft 17 are on a straight line extending in the horizontal direction when viewed in the axial direction of the peripheral wall 14b of the rotor housing 14.

The drive rotor 20 and the driven rotor 21 are each formed such that the width in a middle portion is less than the widths in the opposite end portions in a cross section perpendicular to the rotation axis r1 of the drive shaft 16 and the rotation axis r2 of the driven shaft 17. The drive rotor 20 includes two lobes 20a and two recesses 20b between the two lobes 20a. The driven rotor 21 includes two lobes 21a and two recesses 21b between the two lobes 21a.

The drive rotor 20 and the driven rotor 21 are capable of rotating in the rotor chamber 25, while repeating meshing between the lobes 20a of the drive rotor 20 and the recesses 21b of the driven rotor 21, and meshing between the recesses 20b of the drive rotor 20 and the lobes 21a of the driven rotor 21. The drive rotor 20 rotates in a direction of arrow R1 in FIGS. 2 and 3, and the driven rotor 21 rotates in a direction of arrow R2 in FIGS. 2 and 3.

The rotor housing 14 includes a suction port 45, through which hydrogen is drawn into the rotor chamber 25, and a discharge port 46, through which hydrogen in the rotor chamber 25 is discharged. The suction port 45 and the discharge port 46 are formed in the peripheral wall 14b of the rotor housing 14 and located at positions opposed to each other across the rotor chamber 25. The suction port 45 and the discharge port 46 connect the rotor chamber 25 to the outside.

A direction Z1 along a straight line that connects the suction port 45 and the discharge port 46 to each other is orthogonal to the rotation axis r1 of the drive shaft 16 and the rotation axis r2 of the driven shaft 17. The Roots pump 10 of the present embodiment is mounted on the fuel cell vehicle such that the suction port 45 opens vertically downward in relation to the outside of the Roots pump 10, and that the discharge port 46 opens vertically upward in relation to the outside of the Roots pump 10. Accordingly, the suction port 45 is arranged below the rotor chamber 25 in the vertical direction. The discharge port 46 is arranged above the rotor chamber 25 in the vertical direction. The direction Z1 in FIGS. 2 and 3 agrees with the vertical direction, which is the direction of gravitational force.

The inner circumferential surface of the peripheral wall 14b of the rotor housing 14 includes a first guiding surface 141b, a second guiding surface 142b, and two connecting surfaces 143b. The first guiding surface 141b extends semi-circularly about the rotation axis of the drive rotor 20 and guides the drive rotor 20. The first guiding surface 141b extends along an imaginary circle C1, along which an outermost portion 20e of each lobe 20a of the drive rotor 20 moves when the drive rotor 20 is rotating. The rotation axis of the drive rotor 20 agrees with the rotation axis r1 of the drive shaft 16. The second guiding surface 142b extends semi-circularly about the rotation axis of the driven rotor 21 and guides the driven rotor 21. The second guiding surface 142b extends along an imaginary circle C2, along which an outermost portion 21e of each lobe 21a of the driven rotor 21 moves when the driven rotor 21 is rotating. The rotation axis of the driven rotor 21 agrees with the rotation axis r2 of the driven shaft 17. The two connecting surfaces 143b connect the first guiding surface 141b and the second guiding surface 142b to each other, and are arranged at positions opposed to each other across the rotor chamber 25.

One of the two connecting surfaces 143b includes a first arcuate surface 47a and a second arcuate surface 47b. The first arcuate surface 47a is continuous with the first guiding surface 141b to extend arcuately about the rotation axis of the drive rotor 20, and guides the drive rotor 20. The first arcuate surface 47a extends along the imaginary circle C1, along which the outermost portion 20e of each lobe 20a of the drive rotor 20 moves. The first arcuate surface 47a and the first guiding surface 141b are located on a concentric circle. The second arcuate surface 47b is continuous with the second guiding surface 142b to extend arcuately about the rotation axis of the driven rotor 21, and is connected to the first arcuate surface 47a. The second arcuate surface 47b guides the driven rotor 21. The second arcuate surface 47b extends along the imaginary circle C2, along which the outermost portion 21e of each lobe 21a of the driven rotor 21 moves. The second arcuate surface 47b and the second guiding surface 142b are located on a concentric circle. Part of the peripheral wall 14b of the rotor housing 14 forms a bulging portion 47, which includes the first arcuate surface 47a and the second arcuate surface 47b. The rotor housing 14 thus includes the bulging portion 47, which is a part of the peripheral wall 14b that bulges radially inward at a position between the drive rotor 20 and the driven rotor 21. The bulging portion 47 is defined by the first arcuate surface 47a and the second arcuate surface 47b and bulges further radially inward than the remaining portions of the peripheral wall 14b.

The bulging portion 47 is arranged in an upper portion of the peripheral wall 14b of the rotor housing 14 in the vertical direction. One of the two connecting surfaces 143b that is opposed to the bulging portion 47 across the rotor chamber 25 is a smooth surface 48, which is not bulging toward the bulging portion 47. In the present embodiment, the smooth surface 48 is a flat surface that extends in the horizontal direction. The suction port 45 extends through the peripheral wall 14b of the rotor housing 14 and opens in the smooth surface 48. The discharge port 46 extends through the bulging portion 47. The discharge port 46 opens in the connecting surface 143b to be located over the boundary between the first arcuate surface 47a and the second arcuate surface 47b.

When the drive shaft 16 is rotated by the electric motor 22, the driven shaft 17 rotates in a direction opposite to the rotating direction of the drive shaft 16 through the action of the drive gear 18 and the driven gear 19, which mesh with each other. This causes the drive rotor 20 and the driven rotor 21 to rotate in opposite directions while meshing with each other. Through rotations of the drive rotor 20 and the driven rotor 21, the Roots pump 10 draws hydrogen into the rotor chamber 25 through the suction port 45, and discharges hydrogen from the rotor chamber 25 through the discharge port 46. The drive rotor 20 is driven by the drive shaft 16, and the driven rotor 21 operates in conjunction with the drive rotor 20.

As shown in FIG. 1, a seal member 50 is arranged between the opening end face 12c of the motor housing 12 and the outer surface 13c of the end wall 13a of the gear housing 13, and serves as a seal between the opening end face 12c and the outer surface 13c. Another seal member 50 is arranged between the opening end face 13d of the gear housing 13 and the outer surface 14c of the end wall 14a of the rotor housing 14, and serves as a seal between the opening end face 13d and the outer surface 14c. Further, another seal member 50 is arranged between the opening end face 14d of the rotor housing 14 and the end face 15a of the cover member 15, and serves as a seal between the opening end face 14d and the end face 15a. The respective seal members 50 disconnect the inside of the housing unit 11 from the outside. The seal members 50 are elastic bodies. The seal members 50 made of rubber.

In the following description, the configuration of the seal member 50 provided between the opening end face 14d of the rotor housing 14 and the end face 15a of the cover member 15 will be described. The remaining two seal members 50 substantially have the same construction. Detailed description thereof will thus be omitted.

Figure 4:
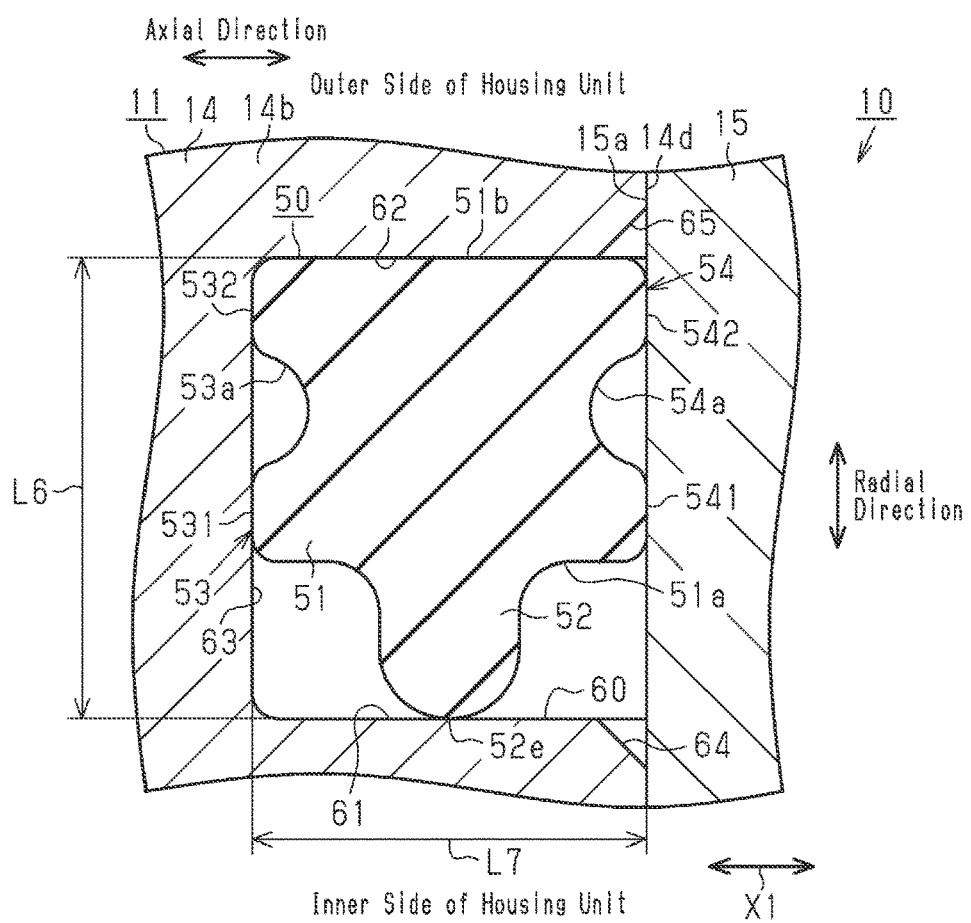
FIG. 4 is a cross-sectional view taken along line 4-4 of FIG. 3.

As shown in FIG. 4, the opening end face 14d of the rotor housing 14 includes a seal accommodating groove 60, which is an annular first groove. The seal member 50 is accommodated in the seal accommodating groove 60. The opening of the seal accommodating groove 60 is closed by the end face 15a of the cover member 15. The opening end face 14d of the rotor housing 14 is a first forming surface, which forms a mating surface that faces the cover member 15. The end face 15a of the cover member 15 is a second forming surface, which forms a mating surface that faces the rotor housing 14. In the present embodiment, the seal accommodating groove 60 is formed in the first forming surface, and the opening of the seal accommodating groove 60 is closed by the second forming surface. The seal accommodating groove 60 is formed in one of the mating surface of the peripheral wall 14b of the rotor housing 14 or the mating surface of the cover member 15. That is, the seal accommodating groove 60 is formed in one of the first forming surface of the rotor housing 14 or the second forming surface of the cover member 15. The bulging portion 47 includes a mating surface opposed to the cover member 15.

The seal accommodating groove 60 has an annular inner-side circumferential surface 61, which is located on the inner side in the housing unit 11, and an annular outer-side circumferential surface 62, which is located on the outer side in the housing unit 11. The inner-side circumferential surface 61 is a side surface on the radially inner side of the seal accommodating groove 60. The outer-side circumferential surface 62 is a side surface on the radially outer side of the seal accommodating groove 60. The seal accommodating groove 60 also has a bottom surface 63, which connects the bottom-side edge of the inner-side circumferential surface 61 and the bottom-side edge of the outer-side circumferential surface 62. The seal accommodating groove 60 thus includes the bottom surface 63 and two side surfaces connected to the bottom surface 63, which are the groove inner-side circumferential surface 61 and the groove outer-side circumferential surface 62.

The inner-side circumferential surface 61 is located on the side closer to the inner circumferential surface of the peripheral wall 14b with respect to the bottom surface 63. The outer-side circumferential surface 62 is located on the side closer to the outer circumferential surface of the peripheral wall 14b with respect to the bottom surface 63. Therefore, one of the two side surfaces of the seal accommodating groove 60 is located on the side closer to the inner circumferential surface of the peripheral wall 14b with respect to the bottom surface 63, and the other side surface is located on the side closer to the outer circumferential surface of the peripheral wall 14b with respect to the bottom surface 63. The inner-side circumferential surface 61 and the outer-side circumferential surface 62 extend parallel with the axial direction of the peripheral wall 14b. The bottom surface 63 extends in a direction orthogonal to the axial direction of the peripheral wall 14b. The bottom surface 63 extends parallel with the opening end face 14d of the rotor housing 14.

The seal accommodating groove 60 has an annular inner-side chamfered portion 64, which is formed between the open-side edge of the inner-side circumferential surface 61 and the opening end face 14d of the rotor housing 14. The seal accommodating groove 60 also has an annular outer-side chamfered portion 65, which is formed between the open-side edge of the outer-side circumferential surface 62 and the opening end face 14d of the rotor housing 14. The inner-side chamfered portion 64 and the outer-side chamfered portion 65 are chamfered surfaces that extend in a straight manner and are inclined with respect to the opening end face 14d of the rotor housing 14. The inner-side chamfered portion 64 and the outer-side chamfered portion 65 of the seal accommodating groove 60 facilitate installation of the seal member 50 to the seal accommodating groove 60.

As shown in FIG. 3, the seal accommodating groove 60 formed in the opening end face 14d of the rotor housing 14 has an elliptic annular shape that extends along the peripheral wall 14b of the rotor housing 14. The seal member 50 accommodated in the seal accommodating groove 60 is formed to have an elliptic annular shape in accordance with the shape of the seal accommodating groove 60.

Figure 5:
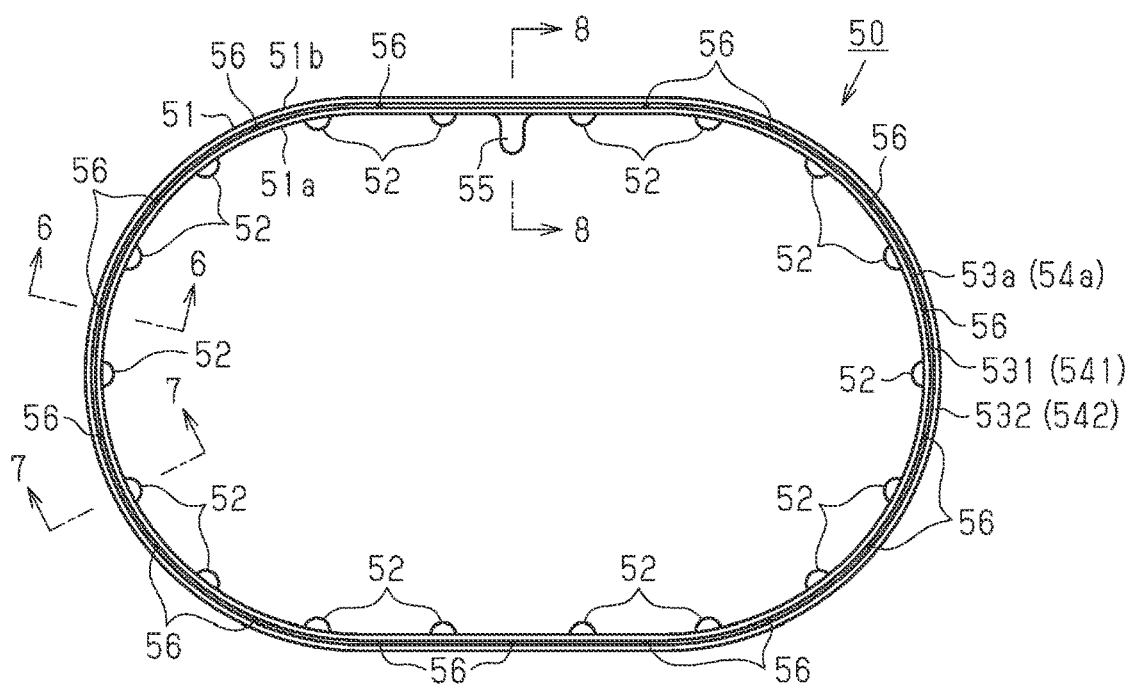
FIG. 5 is a front view of a seal member.

As shown in FIG. 5, the seal member 50 includes an elliptic annular seal body 51 and pushing projections 52. The pushing projections 52 project from the inner circumferential surface 51a of the seal body 51. The pushing projections 52, which are first projections, are arranged at equal intervals in the circumferential direction of the seal body 51. In the following description, the direction extending through the seal body 51 will be referred to as an axial direction of the seal body 51. Any direction that is orthogonal to the axis of the seal body 51 and extends from the axis will be referred to as a radial direction of the seal body 51.

The pushing projections 52 are arranged at equal intervals in the circumferential direction of the seal body 51. The pushing projections 52 are thin plate-shaped and project from the inner circumferential surface 51a of the seal body 51. The thickness direction of each pushing projection 52 agrees with the axial direction of the seal body 51. Each pushing projection 52 has parallel flat surfaces on the opposite sides in the thickness direction. Each pushing projection 52 has a curved surface that is continuous with and bulges from the inner circumferential surface 51a of the seal body 51.

Figure 6:
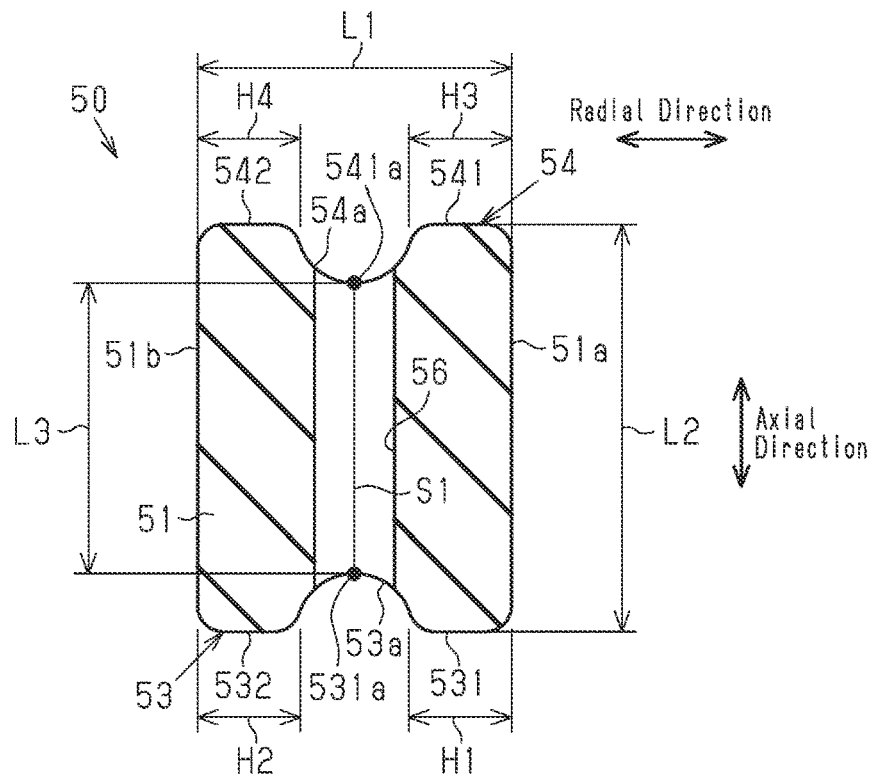
FIG. 6 is a cross-sectional view taken along line 6-6 of FIG. 5.

As shown in FIG. 6, the seal body 51 includes an annular first contact portion 531 and an annular second contact portion 532. The first contact portion 531 and the second contact portion 532 are spaced apart from each other in the radial direction of the seal body 51 and extend over the entire circumference of the seal body 51. The seal body 51 also has an annular first groove 53a located between the first contact portion 531 and the second contact portion 532, which are adjacent to each other.

The first contact portion 531 is located on the radially inner side of the first groove 53a. The second contact portion 532 is located on the radially outer side of the first groove 53a. The first contact portion 531 is continuous with the inner circumferential surface 51a of the seal body 51. The second contact portion 532 is continuous with an outer circumferential surface 51b of the seal body 51. The first contact portion 531 and the second contact portion 532 are adjacent to each other in the radial direction of the seal body 51. The outer surface of the first contact portion 531 and the outer surface of the second contact portion 532 overlap with each other when viewed in the radial direction of the seal body 51. In other words, the outer surface of the first contact portion 531 and the outer surface of the second contact portion 532 are located at the same position in the axial direction of the seal body 51. The outer surface of the first contact portion 531 and the outer surface of the second contact portion 532 are connected to each other by the inner surface of the first groove 53a. The inner surface of the first groove 53a is curved to be arcuate.

A width H1 of the first contact portion 531 in the radial direction of the seal body 51 is uniform in the circumferential direction of the seal body 51. A width H2 of the second contact portion 532 in the radial direction of the seal body 51 is uniform in the circumferential direction of the seal body 51. The width H1 of the first contact portion 531 and the width H2 of the second contact portion 532 are equal to each other.

The seal body 51 includes an annular third contact portion 541 and an annular fourth contact portion 542. The third contact portion 541 and the fourth contact portion 542 are spaced apart from each other in the radial direction of the seal body 51 and extend over the entire circumference of the seal body 51. The seal body 51 also has an annular second groove 54a located between the third contact portion 541 and the fourth contact portion 542, which are adjacent to each other.

The third contact portion 541 is located on the radially inner side of the second groove 54a. The fourth contact portion 542 is located on the radially outer side of the second groove 54a. The third contact portion 541 is continuous with the inner circumferential surface 51a of the seal body 51. The fourth contact portion 542 is continuous with the outer circumferential surface 51b of the seal body 51. The third contact portion 541 and the fourth contact portion 542 are adjacent to each other in the radial direction of the seal body 51. The outer surface of the third contact portion 541 and the outer surface of the fourth contact portion 542 overlap with each other when viewed in the radial direction of the seal body 51. In other words, the outer surface of the third contact portion 541 and the outer surface of the fourth contact portion 542 are located at the same position in the axial direction of the seal body 51. The outer surface of the third contact portion 541 and the outer surface of the fourth contact portion 542 are connected to each other by the inner surface of the second groove 54a. The inner surface of the second groove 54a is curved to be arcuate.

A width H3 of the third contact portion 541 in the radial direction of the seal body 51 is uniform in the circumferential direction of the seal body 51. A width H4 of the fourth contact portion 542 in the radial direction of the seal body 51 is uniform in the circumferential direction of the seal body 51. The width H3 of the third contact portion 541 and the width H4 of the fourth contact portion 542 are equal to each other. The width H1 of the first contact portion 531, the width H2 of the second contact portion 532, the width H3 of the third contact portion 541, and the width H4 of the fourth contact portion 542 are equal to each other.

In FIG. 6, a distance L1 is the distance between the inner circumferential surface 51a and the outer circumferential surface 51b of the seal body 51 in the radial direction of the seal body 51. A distance L2 is the distance between the outer surface of the first contact portion 531 and the outer surface of the third contact portion 541 in the axial direction of the seal body 51. The distance L2 is also the distance between the outer surface of the second contact portion 532 and the outer surface of the fourth contact portion 542 in the axial direction of the seal body 51. The distance L1 is less than the distance L2. A deepest section 531a of the first groove 53a and a deepest section 541a of the second groove 54a are located at overlapping positions when viewed in the axial direction of the seal body 51. In other words, the deepest section 531a of the first groove 53a and the deepest section 541a of the second groove 54a are located at the same position in the radial direction of the seal body 51. Thus, a straight line S1 connecting the deepest section 531a of the first groove 53a and the deepest section 541a of the second groove 54a extends in the axial direction of the seal body 51. A length L3 of the straight line S1 is uniform in the circumferential direction of the seal body 51. The depths of the first groove 53a and the second groove 54a are uniform in the circumferential direction of the seal body 51. The depth of the first groove 53a is equal to the depth of the second groove 54a.

Figure 7:
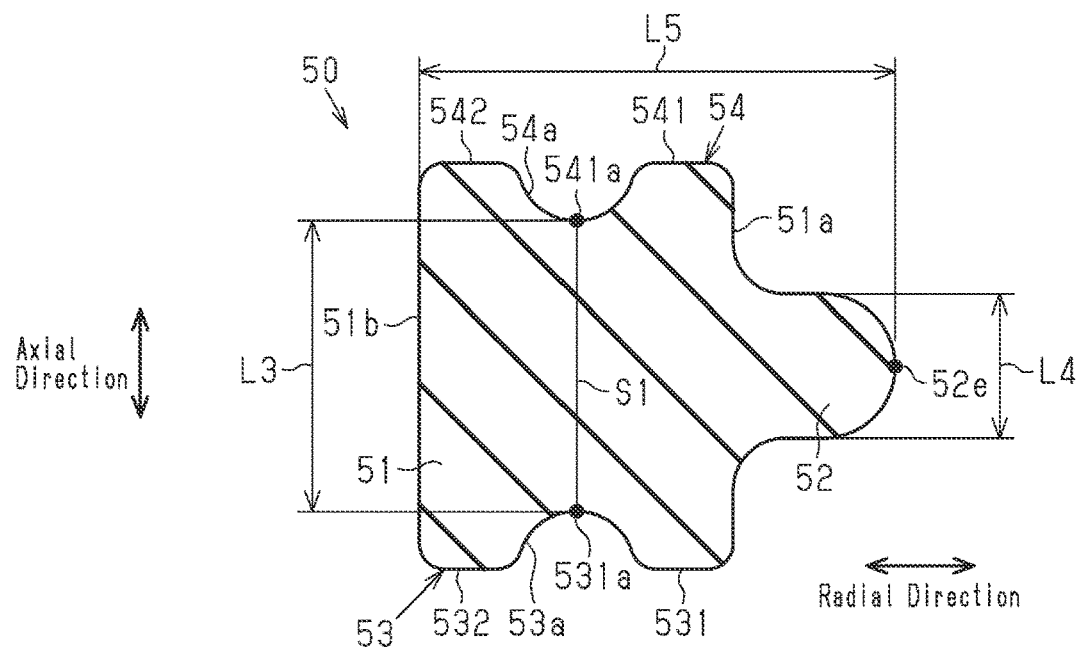
FIG. 7 is a cross-sectional view taken along line 7-7 of FIG. 5.

As shown in FIG. 7, each pushing projection 52 is arranged at the center of the inner circumferential surface 51a of the seal body 51 with respect to the axial direction of the seal body 51 before the seal member 50 is accommodated in the seal accommodating groove 60. Before the seal member 50 is accommodated in the seal accommodating groove 60, a dimension (or a thickness) L4 of the pushing projection 52 in the axial direction of the seal body 51 is less than the length L3 of the straight line S1, which connects the deepest section 531a of the first groove 53a and the deepest section 541a of the second groove 54a to each other. A distance L5 is the distance in the radial direction of the seal body 51 from the outer circumferential surface 51b of the seal body 51 to a distal end 52e of the pushing projection 52. Before the seal member 50 is accommodated in the seal accommodating groove 60, the distance L5 is less than a distance L6, which is the distance in the radial direction of the seal accommodating groove 60 between the inner-side circumferential surface 61 and the outer-side circumferential surface 62 (refer to FIG. 4). Further, a depth L7 of the seal accommodating groove 60 (refer to FIG. 4) is greater than the length L3 of the straight line S1, which connects the deepest section 531a of the first groove 53a and the deepest section 541a of the second groove 54a to each other. Therefore, the depth L7 of the seal accommodating groove 60 is greater than the dimension L4 of the pushing projection 52 in the axial direction of the seal body 51.

As shown in FIG. 4, the first contact portion 531 and the second contact portion 532 are in contact with the bottom surface 63 of the seal accommodating groove 60. The outer surface of the first contact portion 531 and the outer surface of the second contact portion 532 are thus pressed against the rotor housing 14. Over the entire circumference of its annular structure, the first groove 53a is recessed in relation to the outer surface of the first contact portion 531 and the outer surface of the second contact portion 532. The first groove 53a is not in contact with the rotor housing 14. The first contact portion 531 and the second contact portion 532 are in contact with the rotor housing 14 in a mating direction of the opening end face 14d of the rotor housing 14 and the end face 15a of the cover member 15 (indicated by arrow X1 in FIG. 4). The mating direction may be referred to as a facing direction.

The third contact portion 541 and the fourth contact portion 542 are in contact with the end face 15a of the cover member 15. The outer surface of the third contact portion 541 and the outer surface of the fourth contact portion 542 are thus pressed against the cover member 15. Over the entire circumference of its annular structure, the second groove 54a is recessed in relation to the outer surface of the third contact portion 541 and the outer surface of the fourth contact portion 542. The second groove 54a is not in contact with the cover member 15. The third contact portion 541 and the fourth contact portion 542 are in contact with the cover member 15 in a mating direction of the opening end face 14d of the rotor housing 14 and the end face 15a of the cover member 15. The mating direction of the opening end face 14d of the rotor housing 14 and the end face 15a of the cover member 15 agrees with the axial direction of the peripheral wall 14b of the rotor housing 14. The seal member 50 is accommodated in the seal accommodating groove 60 to be pressed against the rotor housing 14 and the cover member 15. The first groove 53a and the second groove 54a are recessed away from each other in the mating direction of the peripheral wall 14b of the rotor housing 14 and the cover member 15.

The pushing projections 52 project from the inner circumferential surface 51a of the seal body 51 toward the inner-side circumferential surface 61 of the seal accommodating groove 60. The distal ends 52e of the pushing projections 52 contact and push the inner-side circumferential surface 61. The seal body 51 receives, from the inner-side circumferential surface 61, a reaction force to the pushing force acting on the inner-side circumferential surface 61 by the pushing projections 52, so that the seal body 51 is in contact with and pressed against the outer-side circumferential surface 62. Accordingly, the seal body 51 is pressed between the inner-side circumferential surface 61 and the outer-side circumferential surface 62 by actions of the pushing projections 52. Therefore, the pushing projections 52 press the seal body 51 against the outer circumference of the seal accommodating groove 60.

The outer surface of the first contact portion 531, the outer surface of the second contact portion 532, and the outer circumferential surface 51b of the seal body 51 form a first seal portion 53, which is pressed against the rotor housing 14 and has a first sealing length. On the other hand, the outer surface of the third contact portion 541 and the outer surface of the fourth contact portion 542 form a second seal portion 54, which is pressed against the cover member 15 and has a sealing length different from the first sealing length.

The seal body 51 thus includes the first seal portion 53, which is pressed against the rotor housing 14, and the second seal portion 54, which is pressed against the cover member 15. The first seal portion 53 includes the first contact portion 531 and the second contact portion 532. The second seal portion 54 includes the third contact portion 541 and the fourth contact portion 542.

Figure 8:
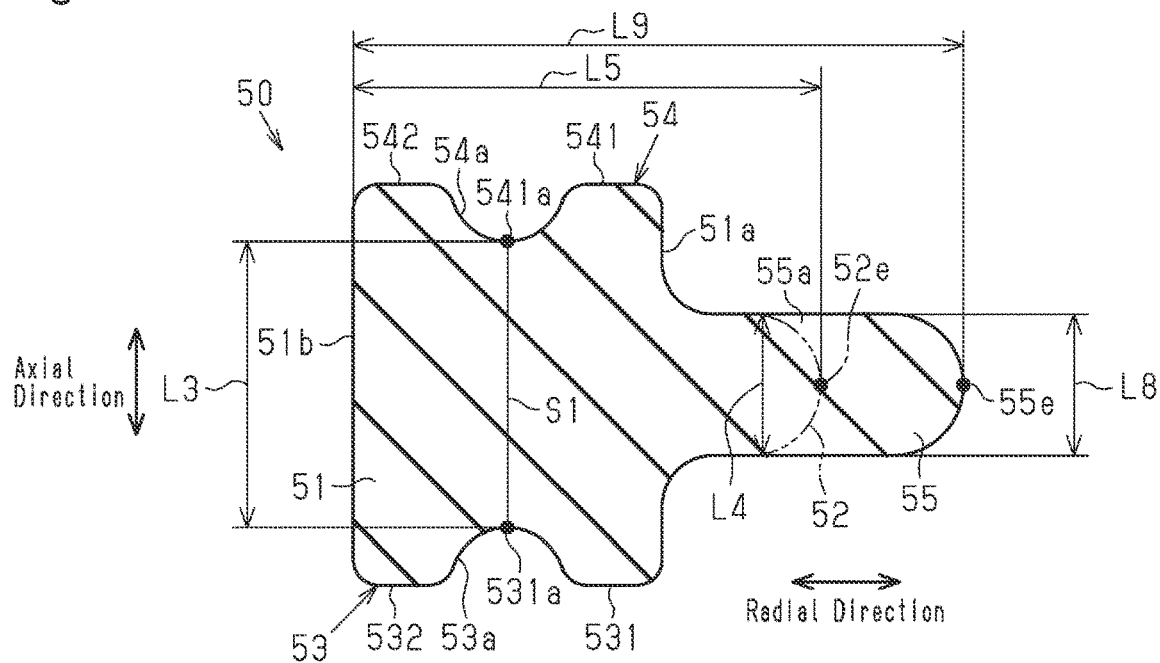
FIG. 8 is a cross-sectional view taken along line 8-8 of FIG. 5.
Figure 9:
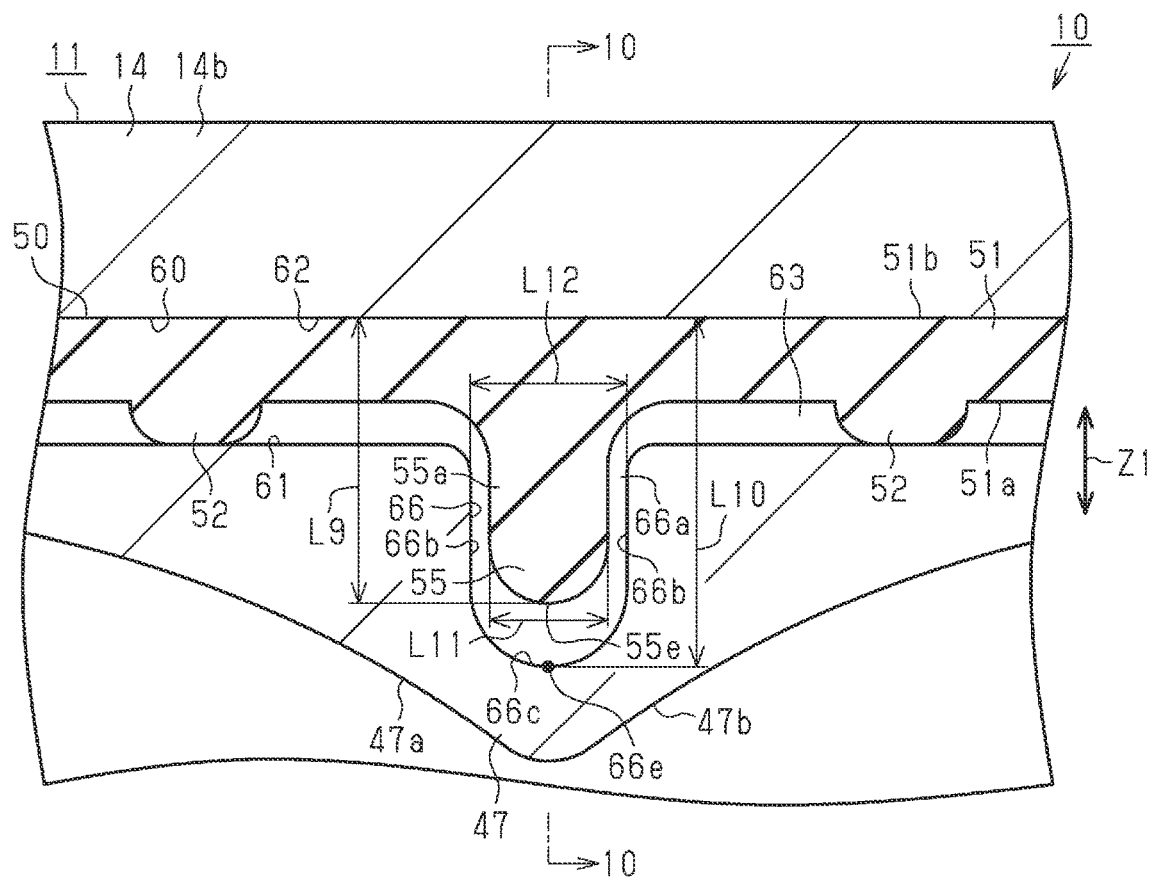
FIG. 9 is an enlarged cross-sectional view showing part of the Roots pump of FIG. 3, including a positioning projection and a positioning groove.

As shown in FIGS. 8 and 9, the seal member 50 includes a positioning projection 55, which is a second projection projecting from the inner circumferential surface 51a of the seal body 51. The positioning projection 55 is thin plate-shaped. The thickness direction of the positioning projection 55 agrees with the axial direction of the seal body 51. The positioning projection 55 has parallel flat surfaces on the opposite sides in the thickness direction. The width direction of the positioning projection 55 agrees with the circumferential direction of the seal body 51. The positioning projection 55 has parallel flat surfaces on the opposite sides in the width direction, and the flat surfaces are continuous with the inner circumferential surface 51a of the seal body 51. The positioning projection 55 includes a projection distal end 55e, which has a curved surface projecting away from the inner circumferential surface 51a of the seal body 51. The positioning projection 55 connects the surfaces on the opposite sides in the thickness direction of the positioning projection 55 to each other, and connects the surfaces on the opposite sides in the width direction of the positioning projection 55. The positioning projection 55 includes the projection distal end 55e and a connecting portion 55a, which connects the seal body 51 to the projection distal end 55e.

As shown in FIG. 8, the positioning projection 55 is arranged at the center of the inner circumferential surface 51a of the seal body 51 with respect to the axial direction of the seal body 51. A dimension (or a thickness) L8 of the positioning projection 55 in the axial direction of the seal body 51 is equal to the dimension (or a thickness) L4 of the pushing projection 52 before the seal member 50 is accommodated in the seal accommodating groove 60. Also, in the radial direction of the seal body 51, a distance L9 from the outer circumferential surface 51b of the seal body 51 to the projection distal end 55e of the positioning projection 55 is greater than the distance L5 from the outer circumferential surface 51b of the seal body 51 to the distal end 52e of the pushing projection 52, before the seal member 50 is accommodated in the seal accommodating groove 60. Accordingly, the positioning projection 55 projects further radially inward from the seal body 51 than the pushing projection 52.

Figure 10:
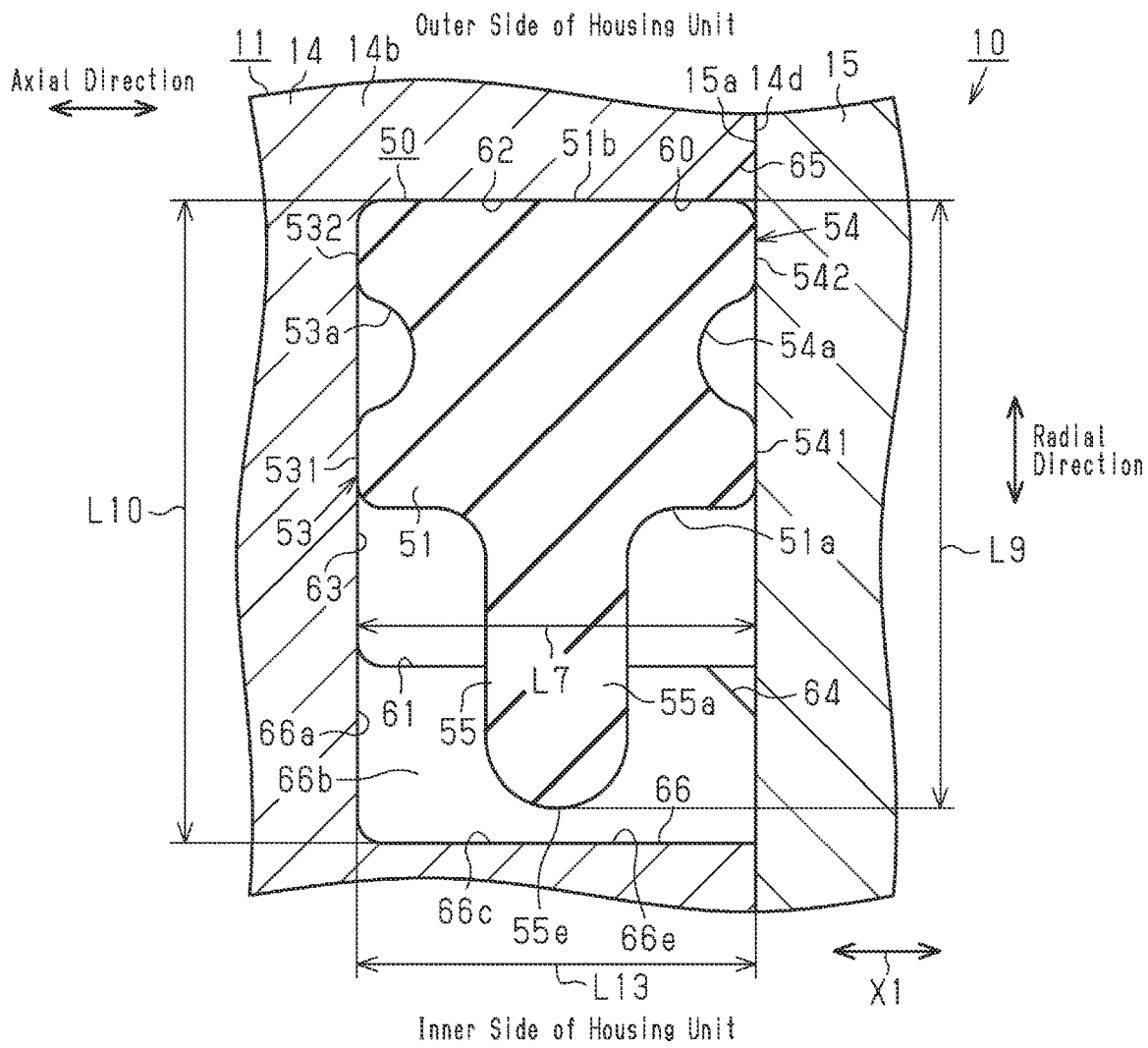
FIG. 10 is a cross-sectional view taken along line 10-10 of FIG. 9.

As shown in FIGS. 9 and 10, the seal accommodating groove 60 includes a positioning groove 66 in the inner-side circumferential surface 61. The positioning groove 66 is a second groove into which the positioning projection 55 is inserted. Thus, the positioning groove 66 is formed in the inner-side circumferential surface 61, which is located on the inner side of the bottom surface 63 with respect to the radial direction of the peripheral wall 14b of the rotor housing 14. The positioning groove 66 is formed in a section of the inner-side circumferential surface 61 that corresponds to the bulging portion 47. Therefore, the positioning groove 66 is provided in the bulging portion 47 and is continuous with the inner-side circumferential surface 61 of the seal accommodating groove 60. The opening of the positioning groove 66 is continuous with the opening end face 14d of the peripheral wall 14b of the rotor housing 14. The opening of the positioning groove 66 is closed by the end face 15a of the cover member 15.

The positioning groove 66 includes a positioning bottom surface 66a, two positioning side surfaces 66b, and a positioning connection surface 66c. The positioning bottom surface 66a is continuous with the bottom surface 63 of the seal accommodating groove 60 and is located on the same plane as the bottom surface 63. The positioning side surfaces 66b are continuous with the inner-side circumferential surface 61 of the seal accommodating groove 60 and are connected to the positioning bottom surface 66a. The positioning side surfaces 66b extend parallel with the axial direction of the peripheral wall 14b of the rotor housing 14, and are each continuous with the opening end face 14d of the peripheral wall 14b of the rotor housing 14. The positioning connection surface 66c is connected to the positioning bottom surface 66a and the positioning side surfaces 66b. The positioning connection surface 66c is a curved surface recessed away from the seal accommodating groove 60. The positioning connection surface 66c is continuous with the opening end face 14d of the peripheral wall 14b of the rotor housing 14.

A distance L10 is the distance from the outer-side circumferential surface 62 to a deepest section 66e of the positioning groove 66 in the radial direction of the peripheral wall 14b of the rotor housing 14. The distance L10 is greater than the distance L9 from the outer circumferential surface 51b of the seal body 51 to the projection distal end 55e of the positioning projection 55. As shown in FIG. 9, a dimension (or a width) L11 of the positioning projection 55 in the circumferential direction of the seal body 51 is less than a dimension (or a width) L12 of the positioning groove 66. Also, as shown in FIG. 10, a depth L13 of the positioning groove 66 is equal to the depth L7 of the seal accommodating groove 60. Therefore, the depth L13 of the positioning groove 66 is greater than the dimension (or the thickness) L8 of the positioning projection 55 in the axial direction of the seal body 51.

The positioning projection 55 is inserted into the positioning groove 66 without being pressed against the positioning bottom surface 66a or against the positioning side surfaces 66b. Thus, the positioning projection 55 is inserted into the positioning groove 66 without at least sections except for the projection distal end 55e being pressed against the inner surface of the positioning groove 66. The positioning projection 55 is inserted into the positioning groove 66 with the projection distal end 55e spaced apart from the positioning connection surface 66c. Therefore, the projection distal end 55e of the positioning projection 55 is spaced apart from the inner surface of the positioning groove 66. In this manner, the projection distal end 55e of the positioning projection 55 is not in contact with the inner surface of the positioning groove 66, so that a gap exists between the projection distal end 55e of the positioning projection 55 and the inner surface of the positioning groove 66.

FIG. 4 is a cross-sectional view of the seal member 50 along the axial direction of the seal body 51. Particularly, FIG. 4 shows a cross section including the distal end 52e of the pushing projection 52. The seal member 50 is designed to have, before being elastically deformed in the seal accommodating groove 60, over 100% of filling factor in relation to the seal accommodating groove 60 in the cross section shown in FIG. 4.

Figure 11:
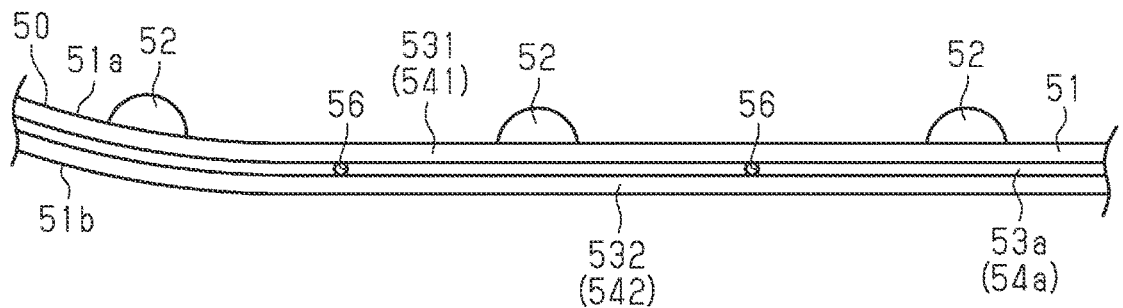
FIG. 11 is an enlarged cross-sectional view showing part of the seal member of FIG. 5.

As shown in FIG. 11, the seal body 51 includes through-holes 56. Each through-hole 56 is a circular hole. The through-holes 56 are arranged at intervals in the circumferential direction of the seal body 51. Each through-hole 56 is located in a region between two of the pushing projections 52 that are adjacent to each other in the circumferential direction of the seal body 51. Each through-hole 56 is located at a position that is equally spaced apart from two of the pushing projections 52 that are adjacent to each other in the circumferential direction of the seal body 51.

As shown in FIG. 6, each through-hole 56 connects the first groove 53a and the second groove 54a to each other. Thus, the seal body 51 includes sections in which the first groove 53a and the second groove 54a are connected to each other by the through-holes 56. The axial direction of each through-hole 56 agrees with the axial direction of the seal body 51. Each through-hole 56 thus extends straight in the axial direction of the seal body 51. Each through-hole 56 includes a first opening, which opens in the first groove 53a. The open edge of the first opening is connected to the outer surface of the first contact portion 531 and the outer surface of the second contact portion 532 by part of the inner surface of the first groove 53a. Each through-hole 56 includes a second opening, which opens in the second groove 54a. The open edge of the second opening is connected to the outer surface of the third contact portion 541 and the outer surface of the fourth contact portion 542 by part of the inner surface of the second groove 54a.

Figure 12:
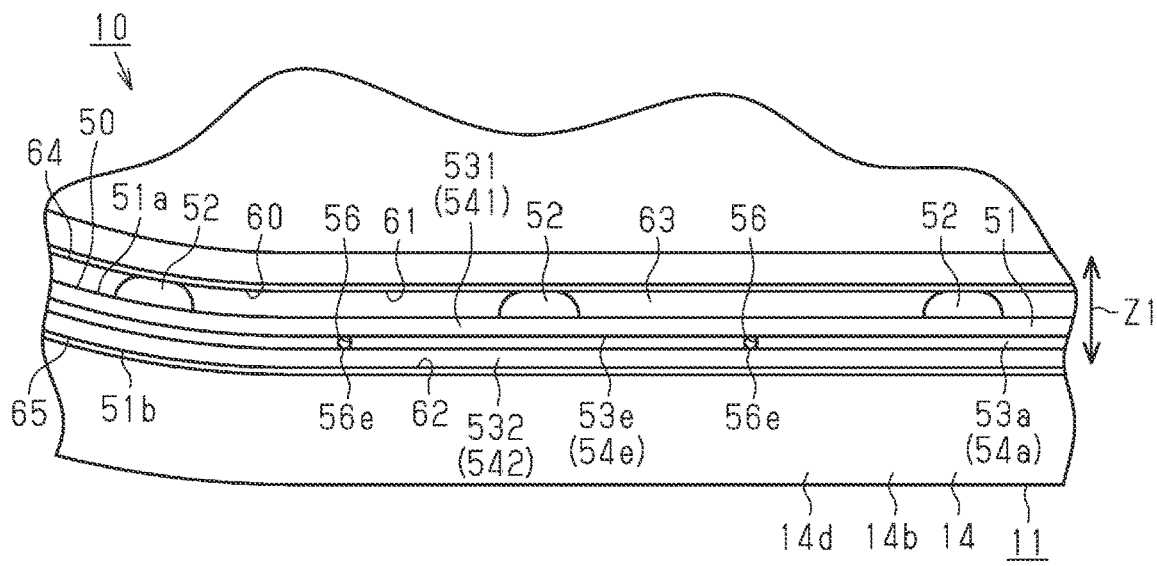
FIG. 12 is an enlarged front view showing an open end of the rotor housing.

In FIG. 12, the reference numerals "56e" denote lowermost parts 56e of one or more of the through-holes 56 that are arranged at the lowermost positions in the vertical direction. Of the first contact portion 531 and the second contact portion 532, the first contact portion 531 is located on the radially inner side of the first groove 53a. The lowermost parts 56e of one or more of the through-holes 56 that are arranged at the lowermost positions are located below a lowermost part 53e of the first contact portion 531 in the vertical direction. Of the third contact portion 541 and the fourth contact portion 542, which are adjacent to each other, the third contact portion 541 is located on the radially inner side of the second groove 54a. The lowermost parts 56e of one or more of the through-holes 56 that are arranged at the lowermost positions are located below a lowermost part Me of the third contact portion 541 in the vertical direction.

An operation of the present embodiment will now be described.

The seal member 50 is installed in the seal accommodating groove 60 by first inserting the positioning projection 55 into the positioning groove 66, and then inserting the seal body 51 into the seal accommodating groove 60. The positioning projection 55 is arranged in the positioning groove 66 so as to determine the position of the seal body 51 in the seal accommodating groove 60. This limits displacement in the circumferential direction of the seal member 50 in relation to the seal accommodating groove 60, so that a gap is unlikely to be created between the outer-side circumferential surface 62 of the seal accommodating groove 60 and the seal member 50.

The seal member 50 is elastically deformed when accommodated in the seal accommodating groove 60. The seal member 50 is designed to have, before being accommodated in the seal accommodating groove 60, over 100% of filling factor in relation to the seal accommodating groove 60 in the cross section including the distal end 52e of the pushing projection 52 along the axial direction of the seal body 51. Thus, when the cover member 15 is attached to the rotor housing 14, the seal member 50 is crushed in the mating direction of the opening end face 14d of the rotor housing 14 and the end face 15a of the cover member 15 in a state in which the first contact portion 531 and the second contact portion 532 are in contact with the bottom surface 63 of the seal accommodating groove 60, and the third contact portion 541 and the fourth contact portion 542 are in contact with the end face 15a of the cover member 15. The seal member 50 is elastically deformed by being crushed in the mating direction of the opening end face 14d of the rotor housing 14 and the end face 15a of the cover member 15. This causes the pushing projections 52 to contact and push the inner-side circumferential surface 61.

When the pushing projections 52 push the inner-side circumferential surface 61, the pushing projections 52 are crushed by receiving, from the inner-side circumferential surface 61, a reaction force to the pushing force applied to on the inner-side circumferential surface 61 by the pushing projections 52. Accordingly, the seal body 51 receives an elastically deforming force directed from the pushing projections 52 toward the opposite sides in the circumferential direction of the seal body 51. At this time, the first contact portion 531 and the second contact portion 532 are in contact with the bottom surface 63 of the seal accommodating groove 60, and the third contact portion 541 and the fourth contact portion 542 are in contact with the end face 15a of the cover member 15. This allows the seal body 51 to be elastically deformed toward the outer-side circumferential surface 62. As a result, the seal body 51 is elastically deformed to cause the outer circumferential surface 51b of the seal body 51 to contact and push the outer-side circumferential surface 62.

When the fuel cell vehicle is traveling, for example, in the vicinity of seashore, the housing unit 11 may be exposed to salt water. In such a case, the seal member 50 prevents salt water from entering the inside of the housing unit 11 from the outside of the housing unit 11 through the gap between the opening end face 14d of the rotor housing 14 and the end face 15a of the cover member 15.

For example, the salt water flowing through the gap between the opening end face 14d of the rotor housing 14 and the end face 15a of the cover member 15 may flow through the gap between the outer circumferential surface 51b of the seal body 51 and the outer-side circumferential surface 62 and through the gap between the second contact portion 532 and the bottom surface 63. In this case, since the salt water is dispersed in the first groove 53a, which is located on the radially inner side of the second contact portion 532, the straightness of the flow of the salt water will be lost. Accordingly, the salt water is unlikely to pass the seal member 50 and is unlikely to enter the housing unit 11.

For example, the salt water flowing through the gap between the opening end face 14d of the rotor housing 14 and the end face 15a of the cover member 15 may flow through the gap between the fourth contact portion 542 and the end face 15a of the cover member 15. In this case, since the salt water is dispersed in the second groove 54a, which is located on the radially inner side of the fourth contact portion 542, the straightness of the flow of the salt water will be lost. Accordingly, the salt water is unlikely to pass the seal member 50 and is unlikely to enter the housing unit 11.

The seal body 51 receives, from the inner-side circumferential surface 61, a reaction force to the pushing force acting on the inner-side circumferential surface 61 by the pushing projections 52, so that the seal body 51 is in contact with and pressed against the outer-side circumferential surface 62. This reduces the gap between the outer-side circumferential surface 62 and the seal member 50. Thus, salt water is unlikely to collect in the gap between the outer-side circumferential surface 62 of the seal accommodating groove 60 and the seal member 50.

Figure 13:
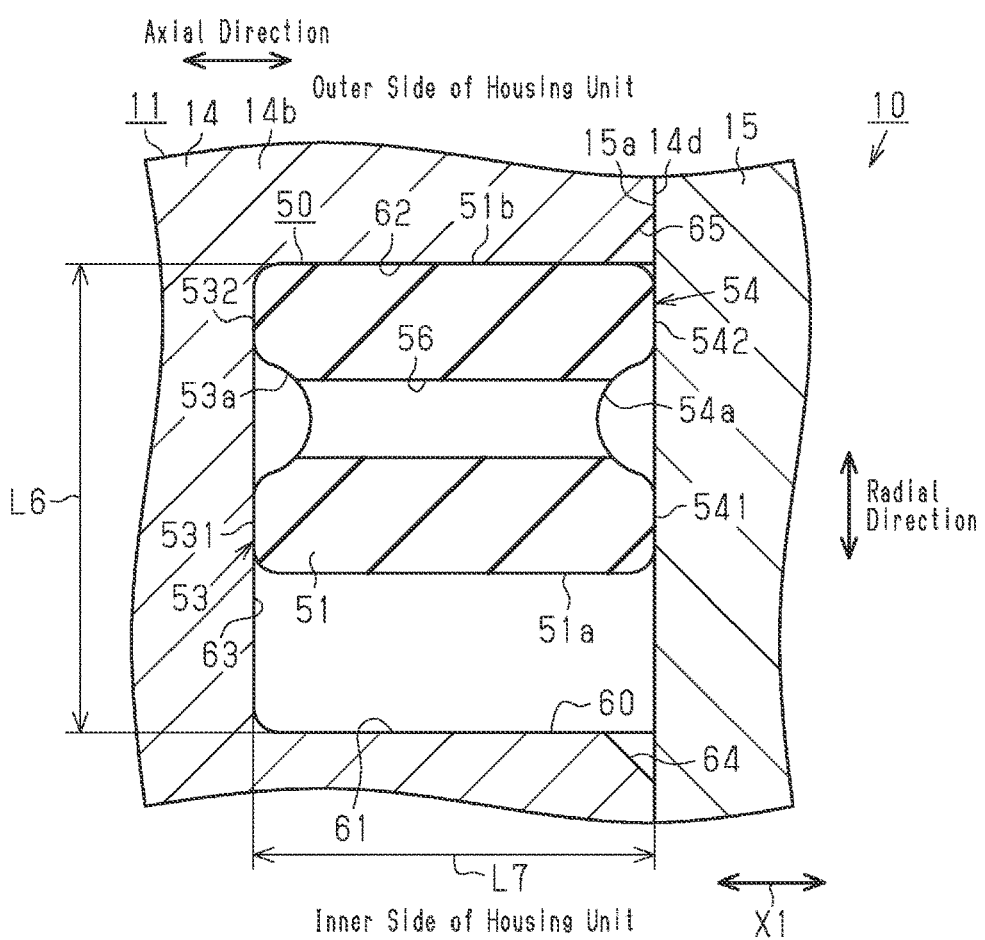
FIG. 13 is a cross-sectional view taken along line 13-13 of FIG. 3.

As shown in FIG. 13, the first sealing length of the first seal portion 53 is the length of a part of the path from the outside of the housing unit 11 to the inside of the housing unit 11, through the boundary between the rotor housing 14 and the first seal portion 53. Specifically, the first sealing length is the length of sections of the first seal portion 53 that are pressed against the rotor housing 14. The first sealing length is the total dimension of the outer surface of the first contact portion 531, the outer surface of the second contact portion 532, and the outer circumferential surface 51b of the seal body 51. A second sealing length of the second seal portion 54 is the length of a part of the path from the outside of the housing unit 11 to the inside of the housing unit 11, through the boundary between the cover member 15 and the first seal portion 53. Specifically, the second sealing length is the length of sections of the second seal portion 54 that are pressed against the cover member 15. The second sealing length is the total dimension of the outer surface of the third contact portion 541 and the outer surface of the fourth contact portion 542. Therefore, the progress of corrosion of the rotor housing 14, the cover member 15, and the seal member 50 varies between a case in which corrosion is caused by salt water existing between the rotor housing 14 and the seal member 50 and a case in which corrosion is caused by salt water existing between the cover member 15 and the seal member 50.

For example, if the material and the surface roughness of the rotor housing 14 and the cover member 15 are similar, the progress of corrosion is more prominent in a region between the cover member 15, which has a short sealing length, and the second seal portion 54 than in a region between the rotor housing 14 and the first seal portion 53. However, since some of the salt water collected in the second groove 54a flows toward the first groove 53a through the through-holes 56, it is possible to retard the progress of corrosion in the region between the cover member 15 and the second seal portion 54.

Also, when the surface roughness of the rotor housing 14 is greater than the surface roughness of the cover member 15, leakage of salt water is more likely to occur in the region between the cover member 15 and the second seal portion 54 than in the region between the rotor housing 14 and the first seal portion 53. Accordingly, even if the first sealing length of the first seal portion 53 is greater than the second sealing length of the second seal portion 54, the progress of corrosion may be more prominent in the region between the rotor housing 14 and the first seal portion 53 than in the region between the cover member 15 and the second seal portion 54. However, since some of the salt water collected in the first groove 53a flows toward the second groove 54a through the through-holes 56, it is possible to retard the progress of corrosion in the region between the rotor housing 14 and the first seal portion 53.

As described above, salt water can flow back and forth between the inside of the first groove 53a and the inside of the second groove 54a through the through-holes 56. Thus, despite the different sealing lengths, the difference in the progress of corrosion between the region between the rotor housing 14 and the seal member 50 and the region between the cover member 15 and the seal member 50 is likely to be reduced.

The above-described embodiment has the following advantages.

(1) Since the seal body 51 is pressed between the inner-side circumferential surface 61 and the outer-side circumferential surface 62 by actions of the pushing projections 52, the gap between the outer-side circumferential surface 62 and the seal member 50 is reduced. Thus, salt water is unlikely to collect in the gap between the outer-side circumferential surface 62 and the seal member 50. This improves the corrosion resistance of the housing unit 11 and the seal member 50.

The seal accommodating groove 60 may have a shape that is not a true circular loop as in the present embodiment, but an elliptic loop or a rectangular loop, for example. In such cases, the seal member 50, which is accommodated in the seal accommodating groove 60, is formed to have a shape of an elliptic loop or a rectangular loop in accordance with the shape of the seal accommodating groove 60. If the seal member 50 is accommodated with its circumferential position displaced in relation to the seal accommodating groove 60, gaps may be created between the outer-side circumferential surface 62 of the seal accommodating groove 60 and the seal member 50.

In this regard, the Roots pump 10 of the present embodiment includes the positioning groove 66, which is connected to the inner-side circumferential surface 61 of the seal accommodating groove 60, in the bulging portion 47. The positioning projection 55 projecting from the seal body 51 is arranged in the positioning groove 66 to determine the position of the seal body 51 in the seal accommodating groove 60. This limits displacement in the circumferential direction of the seal member 50 in relation to the seal accommodating groove 60, so that a gap is unlikely to be created between the outer-side circumferential surface 62 of the seal accommodating groove 60 and the seal member 50. As a result, salt water is unlikely to collect in the gap between the outer-side circumferential surface 62 and the seal member 50. This improves the corrosion resistance of the housing unit 11 and the seal member 50.

The bulging portion 47 is a part of the peripheral wall 14b of the rotor housing 14 that bulges inward at a position between the drive rotor 20 and the driven rotor 21. Thus, even though the rotor housing 14 includes the bulging portion 47, the bulging portion 47 neither adversely affects rotation of the drive rotor 20 and the driven rotor 21, nor increases the size of the Roots pump 10. Since the bulging portion 47 is provided with the positioning groove 66, the positioning groove 66 can be formed to be connected to the inner-side circumferential surface 61 of the seal accommodating groove 60 without increasing the size of the Roots pump 10. Accordingly, the corrosion resistance is improved without increasing the size of the Roots pump 10.

(2) The projection distal end 55e of the positioning projection 55 is not in contact with the inner surface of the positioning groove 66, so that a gap exists between the projection distal end 55e of the positioning projection 55 and the inner surface of the positioning groove 66. This configuration allows fluid to flow into the gap between the projection distal end 55e of the positioning projection 55 and the inner surface of the positioning groove 66. Accordingly, the seal body 51 is pressed between the inner-side circumferential surface 61 and the outer-side circumferential surface 62 of the seal accommodating groove 60 not only by actions of the pushing projections 52, but also by the pressure of the fluid.

More specifically, the discharge port 46 extends through the bulging portion 47 in the present embodiment. The area around the bulging portion 47 in the rotor chamber 25 is therefore exposed to the discharge pressure. The positioning groove 66 is formed in the inner-side circumferential surface 61, which is located on the inner side of the bottom surface 63 with respect to the radial direction of the peripheral wall 14b of the rotor housing 14. Also, the positioning groove 66 is formed in a section of the inner-side circumferential surface 61 that corresponds to the bulging portion 47. This structure causes hydrogen around the bulging portion 47 to flow into the gap between the positioning projection 55 and the inner surface of the positioning groove 66 through the gap between the opening end face 14d of the rotor housing 14 and the end face 15a of the cover member 15. Accordingly, the seal member 50 is pressed between the inner-side circumferential surface 61 and the outer-side circumferential surface 62 by the pressure of the hydrogen.

This is likely to further reduce the gap between the outer-side circumferential surface 62 and the seal member 50. Therefore, salt water is further unlikely to collect in the gap between the outer-side circumferential surface 62 and the seal member 50. This further improves the corrosion resistance of the housing unit 11 and the seal member 50.

(3) The bulging portion 47 is defined by the first arcuate surface 47a and the second arcuate surface 47b and bulges further inward than the remaining portions of the peripheral wall 14b of the rotor housing 14. This configuration is favorable since, even though the rotor housing 14 includes the bulging portion 47, the bulging portion 47 neither adversely affects rotation of the drive rotor 20 and the driven rotor 21, nor increases the size of the Roots pump 10.

(4) Hydrogen that is drawn into the rotor chamber 25 through the suction port 45 may contains water, for example. In such a case, if the bulging portion 47 is arranged in a lower portion of the peripheral wall 14b of the rotor housing 14 in the vertical direction, water existing in the rotor chamber 25 is likely to flow to the suction port 45, which extends through the bulging portion 47, and water is likely to collect in the rotor chamber 25. In this regard, the bulging portion 47 is arranged in the upper portion of the peripheral wall 14b of the rotor housing 14 in the vertical direction in the present embodiment. Further, one of the two connecting surfaces 143b that is opposed to the bulging portion 47 across the rotor chamber 25 is a smooth surface 48, which is not bulging toward the bulging portion 47. Accordingly, even if water exists in the rotor chamber 25, water on the smooth surface 48 is readily drained out of the rotor chamber 25 through the suction port 45 under its own weight. As a result, for example, ice that is formed when the water in the rotor chamber 25 is frozen is prevented from fixing the drive rotor 20 and the driven rotor 21 to the inner circumferential surface of the peripheral wall 14b of the rotor housing 14. That is, the drive rotor 20 and the driven rotor 21 are not prevented from rotating smoothly by ice.

(5) The positioning projection 55 is inserted into the positioning groove 66 without at least sections except for the projection distal end 55e being pressed against the inner surface of the positioning groove 66. If sections of the positioning projection 55, except for at least the projection distal end 55e, are pressed against the inner surface of the positioning groove 66, the pressing action of the pushing projections 52 will be insufficient. The present embodiment avoids such a problem. Thus, even if the positioning projection 55 is inserted into the positioning groove 66, the seal body 51 is pressed in a favorable manner between the inner-side circumferential surface 61 and the outer-side circumferential surface 62 by actions of the pushing projections 52. Accordingly, a gap is unlikely to be created between the outer-side circumferential surface 62 of the seal accommodating groove 60 and the seal member 50. Therefore, salt water is unlikely to collect in the gap between the outer-side circumferential surface 62 of the seal accommodating groove 60 and the seal member 50. This improves the corrosion resistance of the housing unit 11 and the seal member 50.

(6) The projection distal end 55e of the positioning projection 55 is spaced apart from the inner surface of the positioning groove 66. Thus, when the seal member 50 is installed in the seal accommodating groove 60, the seal body 51 is not pressed between the inner-side circumferential surface 61 and the outer-side circumferential surface 62 by actions of the positioning projection 55. This facilitates installation of the seal member 50 in the seal accommodating groove 60.

(7) The seal member 50 includes sections in which the first groove 53a and the second groove Ma are connected to each other by the through-holes 56. This allows salt water to flow back and forth between the inside of the first groove 53a and the inside of the second groove 54a through the through-holes 56. This reduces the difference in the progress of corrosion between the region between the rotor housing 14 and the seal member 50 and the region between the cover member 15 and the seal member 50. As a result, the corrosion resistance of the housing unit 11 and the seal member 50 is improved.

(8) In the seal body 51, each through-hole 56 is located in a region between two of the pushing projections 52 that are adjacent to each other in the circumferential direction of the seal body 51. If each through-hole 56 is arranged in a section that corresponds to the pushing projection 52 in the seal body 51, the through-hole 56 is highly likely to disappear when the pushing projection 52 is crushed so that the seal body 51 is deformed. The present embodiment reduces the probability of the occurrence of such a case.

(9) The lowermost parts 56e of one or more of the through-holes 56 that are arranged at the lowermost positions in the vertical direction are located below the lowermost part 53e of the first contact portion 531 and the lowermost part 54e of the third contact portion 541 in the vertical direction. This structure allows salt water collected in the first groove 53a to flow into the through-holes 56 before reaching the first contact portion 531, which is located on the radially inner side of the first groove 53a. Thus, salt water collected in the first groove 53a is prevented from collecting in the space between the first contact portion 531 and the rotor housing 14. Also, salt water collected in the second groove 54a, for example, flows into the through-holes 56 before reaching the third contact portion 541, which is located on the radially inner side of the second groove 54a. Thus, salt water collected in the second groove 54a is prevented from collecting in the space between the third contact portion 541 and the cover member 15. This is likely to suppress corrosion in the region between the rotor housing 14 and the seal member 50 and in the region between the cover member 15 and the seal member 50. As a result, the corrosion resistance of the housing unit 11 and the seal member 50 is improved.

(10) The seal body 51 includes the through-holes 56, which are arranged at intervals in the circumferential direction of the seal body 51. This ensures the stiffness of the seal body 51 and limits a reduction in the sealing performance of the seal member 50.

(11) Each through-hole 56 includes the first opening, which opens in the first groove 53a. The open edge of the first opening is connected to the outer surface of the first contact portion 531 and the outer surface of the second contact portion 532 by part of the inner surface of the first groove 53a. Each through-hole 56 includes a second opening, which opens in the second groove 54a. The open edge of the second opening is connected to the outer surface of the third contact portion 541 and the outer surface of the fourth contact portion 542 by part of the inner surface of the second groove 54a. This structure allows salt water collected, for example, in the first groove 53a to be easily guided to the first opening of each through-hole 56 by a part of the inner surface of the first groove 53a. The structure also allows salt water collected, for example, in the second groove 54a to be easily guided to the second opening of each through-hole 56 by a part of the inner surface of the second groove 54a. This allows salt water to readily flow back and forth between the inside of the first groove 53a and the inside of the second groove 54a through the through-holes 56.

(12) Salt water flowing through the gap between the opening end face 14d of the rotor housing 14 and the end face 15a of the cover member 15 is dispersed inside the first groove 53a and the second groove Ma. Accordingly, the straightness of the flow of the salt water is lost, so that the salt water is unlikely to pass the seal member 50. This improves the sealing performance of the seal member 50.

(13) The distance L1 is the distance between the inner circumferential surface 51a and the outer circumferential surface 51b of the seal body 51 in the radial direction of the seal body 51. The distance L2 is the distance between the outer surface of the first contact portion 531 and the outer surface of the third contact portion 541 in the axial direction of the seal body 51. The distance L2 is also the distance between the outer surface of the second contact portion 532 and the outer surface of the fourth contact portion 542 in the axial direction of the seal body 51. The distance L1 is less than the distance L2. Even in this case, when the cover member 15 is attached to the rotor housing 14, the seal member 50 is prevented from collapsing or being twisted since the pushing projections 52 contact the inner-side circumferential surface 61.

(14) The dimension L4 of the pushing projection 52 in the axial direction of the seal body 51 is less than the length L3 of the straight line S1, which connects the deepest section 531a of the first groove 53a and the deepest section 541a of the second groove 54a to each other. The depth L7 of the seal accommodating groove 60 is greater than the dimension L4 of the pushing projection 52. This prevents the pushing projections 52 from contacting the bottom surface 63 of the seal accommodating groove 60 and the end face 15a of the cover member 15. Thus, the seal body 51 receives, from the inner-side circumferential surface 61, a reaction force to the pushing force applied to the inner-side circumferential surface 61 by the pushing projections 52, so that the seal body 51 is elastically deformed to readily push the outer-side circumferential surface 62. This ensures reduction in the gap between the outer-side circumferential surface 62 of the seal accommodating groove 60 and the seal member 50.

(15) Before the seal member 50 is accommodated in the seal accommodating groove 60, the distance L5 in the radial direction of the seal body 51 between the outer circumferential surface 51b of the seal body 51 and the distal end 52e of each pushing projection 52 is less than the distance L6 in the radial direction of the seal accommodating groove 60 between the inner-side circumferential surface 61 and the outer-side circumferential surface 62. This allows the seal member 50 to be easily accommodated in the seal accommodating groove 60, facilitating the installation of the seal member 50 in the seal accommodating groove 60.

(16) The depth L7 of the seal accommodating groove 60 is greater than the length L3 of the straight line S1, which connects the deepest section 531a of the first groove 53a and the deepest section 541a of the second groove 54a to each other. Thus, when the seal member 50 is elastically deformed by being crushed in the mating direction of the opening end face 14d of the rotor housing 14 and the end face 15a of the cover member 15, the first groove 53a and the second groove 54a do not disappear. Also, when the seal body 51 is elastically deformed by receiving, from the inner-side circumferential surface 61, a reaction force to the pushing force applied to the inner-side circumferential surface 61 by the pushing projections 52, the first groove 53a and the second groove 54a do not disappear.

(17) The pushing projections 52 are arranged at equal intervals in the circumferential direction of the seal body 51. With this configuration, when the pushing projections 52 are crushed, the seal body 51 is likely to be elastically deformed toward the opposite sides in the circumferential direction of the seal body 51 from the pushing projections 52. This prevents the seal body 51 from being elastically deformed in a manner pushing away the cover member 15. Accordingly, the sealing performance between the opening end face 14d of the rotor housing 14 and the end face 15a of the cover member 15 is maintained.

The above-described embodiment may be modified as follows. The above-described embodiment and the following modifications can be combined as long as the combined modifications remain technically consistent with each other.

Figure 14:
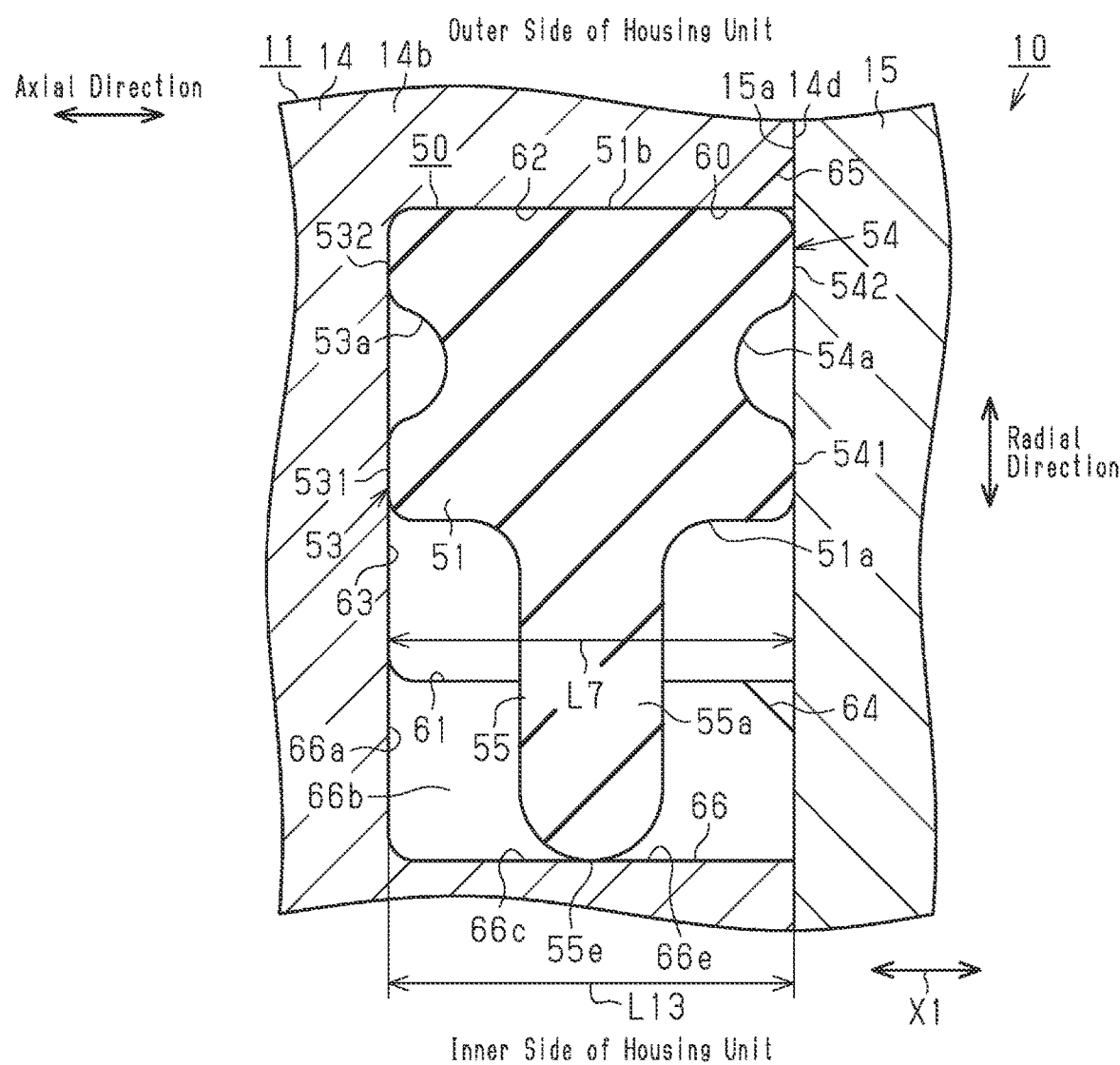
FIG. 14 is an enlarged cross-sectional view of a Roots pump according to another embodiment, showing a section including a positioning projection.

As shown in FIG. 14, at least the projection distal end 55e of the positioning projection 55 may contact the inner surface of the positioning groove 66. With this configuration, the seal body 51 is pressed between the inner-side circumferential surface 61 and the outer-side circumferential surface 62 by actions of the positioning projection 55 in addition to actions of the pushing projections 52. This allows the gap between the outer-side circumferential surface 62 and the seal member 50 to be easily reduced. Therefore, salt water is further unlikely to collect in the gap between the outer-side circumferential surface 62 and the seal member 50. This further improves the corrosion resistance of the housing unit 11 and the seal member 50.

In the embodiment, the seal accommodating groove 60 may be true circular loop-shaped, and the seal member 50, which is accommodated in the seal accommodating groove 60, may be true circular loop-shaped in correspondence with the shape of the seal accommodating groove 60. With this configuration also, displacement in the circumferential direction of the seal member 50 in relation to the seal accommodating groove 60 is limited by inserting the positioning projection 55 into the positioning groove 66. This allows the seal member 50 to be accommodated in the seal accommodating groove 60 such that the lowermost parts 56e of one or more of the through-holes 56 are located below the lowermost part 53e of the first contact portion 531 and the lowermost part 54e of the third contact portion 541 in the vertical direction.

In the embodiment, the seal accommodating groove 60 may be formed in the end face 15a of the cover member 15, not in the opening end face 14d of the rotor housing 14, and the opening of the seal accommodating groove 60 may be closed by the opening end face 14d of the rotor housing 14.

In the embodiment, a seal accommodating groove 60 may be formed in the end face 15a of the cover member 15, in addition to the opening end face 14d of the rotor housing 14, and the seal accommodating grooves 60 may be aligned with each other when viewed in the mating direction of the opening end face 14d of the rotor housing 14 and the end face 15a of the cover member 15. That is, it suffices if the seal accommodating groove 60 is formed in at least one of the mating surface of the peripheral wall 14b of the rotor housing 14 or the mating surface of the cover member 15. In other words, it suffices if the seal accommodating groove 60 is formed in one of the first forming surface of the rotor housing 14 or the second forming surface of the cover member 15. If the peripheral wall 14b and the cover member 15 each have the seal accommodating groove 60, the third contact portion 541 and the fourth contact portion 542 are in contact with the bottom surface 63 of the seal accommodating groove 60 formed in the end face 15a of the cover member 15. The pushing projections 52 push the inner-side circumferential surface 61 of each seal accommodating groove 60 at the boundary between the peripheral wall 14b and the cover member 15. The outer circumferential surface 51b of the seal body 51 is in contact with and pressed against the outer-side circumferential surfaces 62 of the two seal accommodating grooves 60. This reduces the difference between the sealing length between the cover member 15 and the seal member 50 and the sealing length between the rotor housing 14 and the seal member 50. As a result, the sealing performance of the seal member 50 is improved.

In the embodiment, pushing projections 52 may project from the outer circumferential surface 51b of the seal body 51. Also, the seal member 50 may be accommodated in the seal accommodating groove 60 in a state in which the pushing projections 52 are in contact with the outer-side circumferential surface 62. In this case, the inner circumferential surface Ma of the seal body 51 receives, from the outer-side circumferential surface 62, a reaction force to the pushing force applied to the outer-side circumferential surface 62 by the pushing projections 52, so that the inner circumferential surface 51a of the seal body 51 is in contact with and pressed against the inner-side circumferential surface 61. For example, hydrogen drawn into the rotor chamber 25 contains water generated during generation of power in the fuel cell. The seal member 50 limits leakage of hydrogen containing the generated water to the outside of the housing unit 11 from the inside of the rotor chamber 25 through the gap between the opening end face 14d of the rotor housing 14 and the end face 15a of the cover member 15. Since the inner circumferential surface 51a of the seal body 51 is in contact with and pressed against the inner-side circumferential surface 61, the gap between the inner-side circumferential surface 61 and the seal member 50 is reduced. Thus, hydrogen containing generated water is unlikely to collect in the gap between the outer-side circumferential surface 62 of the seal accommodating groove 60 and the seal member 50. This improves the corrosion resistance of the housing unit 11 and the seal member 50.

In the embodiment, the bulging portion 47 may be arranged in a lower portion of the peripheral wall 14b of the rotor housing 14 in the vertical direction.

In the embodiment, the two connecting surfaces 143b may each include a first arcuate surface 47a and a second arcuate surface 47b. That is, it suffices if at least one of the two connecting surfaces 143b includes a first arcuate surface 47a and a second arcuate surface 47b. In this case, the peripheral wall 14b of the rotor housing 14 includes a bulging portion 47 at each of two positions opposed to each other across the rotor chamber 25.

In the embodiment, the discharge port 46 may extend through the peripheral wall 14b of the rotor housing 14 and opens in the smooth surface 48, and the suction port 45 may extend through the bulging portion 47. That is, the suction port 45 may be arranged above the rotor chamber 25 in the vertical direction, and the discharge port 46 may be arranged below the rotor chamber 25 in the vertical direction.

In the embodiment, the smooth surface 48 may be a curved surface that does not bulge toward the bulging portion 47. That is, it suffices if the connecting surfaces 143b, which are opposed to the bulging portion 47 across the rotor chamber 25, is the smooth surface 48, which does not bulge toward the bulging portion 47.

In the embodiment, the positioning projection 55 may be arranged in the positioning groove 66 in a state in which at least sections, except for the projection distal end 55e, are pressed against the positioning groove 66.

In the embodiment, the lowermost parts 56e of one or more of the through-holes 56 that are arranged at the lowermost positions in the vertical direction may be located in the same plane in the horizontal direction as the lowermost part 53e of the first contact portion 531 and the lowermost part 54e of the third contact portion 541.

In the embodiment, the lowermost parts 56e of one or more of the through-holes 56 that are arranged at the lowermost positions in the vertical direction may located above the lowermost part 53e of the first contact portion 531 and the lowermost part 54e of the third contact portion 541 in the vertical direction.

In the embodiment, each through-hole 56 may be located at a position that is closer to one of two of the pushing projections 52 that are adjacent to each other in the circumferential direction of the seal body 51. That is, each through-hole 56 may located at a position that is at different distances from two of the pushing projections 52 that are adjacent to each other in the circumferential direction of the seal body 51.

In the embodiment, each through-hole 56 may be located at a position in the seal body 51 that corresponds to one of the pushing projections 52 in the circumferential direction of the seal body 51.

In the embodiment, the number of the through-holes 56 is not particularly limited, but may be changed.

In the embodiment, the through-holes 56 may be replaced by an annular hole that extends over the entire circumference of the seal body 51.

In the embodiment, the shape of the through-hole 56 is not limited to circular, but may be rectangular, for example. That is, the shape of the through-hole 56 is not particularly limited as long as the through-hole 56 connects the first groove 53a and the second groove 54a to each other.

In the embodiment, the seal body 51 does not necessarily include the through-holes 56.

In the embodiment, the seal member 50 does not necessarily include the first groove 53a. In this case, the seal member 50 has a groove-less end face at the first end in the axial direction of the seal body 51, and the entire groove-less end face can contact the rotor housing 14 in the mating direction of the opening end face 14d of the rotor housing 14 and the end face 15a of the cover member 15. This ensures a long sealing length between the rotor housing 14 and the seal member 50.

In the embodiment, the seal member 50 does not necessarily include the second groove 54a. In this case, the seal member 50 has a groove-less end face at the second end in the axial direction of the seal body 51, and the entire groove-less end face can contact the cover member 15 in the mating direction of the opening end face 14d of the rotor housing 14 and the end face 15a of the cover member 15. This ensures a long sealing length between the cover member 15 and the seal member 50.

In the embodiment, the seal member 50 may include two or more first grooves 53a formed in the seal body 51.

In the embodiment, the seal member 50 may include two or more second grooves 54a formed in the seal body 51.

In the embodiment, the sum of the width H3 of the third contact portion 541 and the width H4 of the fourth contact portion 542 may be greater than the sum of the width H1 of the first contact portion 531 and the width H2 of the second contact portion 532.

In the embodiment, the distance L1 in the radial direction of the seal body 51 between the inner circumferential surface 51a and the outer circumferential surface 51b of the seal body 51 may be greater than the distance L2 in the axial direction of the seal body 51 between the outer surface of the first contact portion 531 and the outer surface of the third contact portion 541, and may be greater than the distance L2 in the axial direction of the seal body 51 between the outer surface of the second contact portion 532 and the outer surface of the fourth contact portion 542.

In the embodiment, the dimension L4 of the pushing projection 52 in the axial direction of the seal body 51 may be equal to the length L3 of the straight line S1, which connects the deepest section 531a of the first groove 53a and the deepest section 541a of the second groove 54a to each other.

In the embodiment, the dimension L4 of the pushing projection 52 in the axial direction of the seal body 51 may be greater than the length L3 of the straight line S1, which connects the deepest section 531a of the first groove 53a and the deepest section 541a of the second groove 54a, as long as the dimension L4 is less than the distance L2 in the axial direction of the seal body 51 between the outer surfaces of the first and second contact portions 531, 532 and the outer surfaces of the third and fourth contact portions 541, 542.

In the embodiment, the number of the pushing projections 52 may be changed to any number greater than one.

In the embodiment, the inner-side circumferential surface 61 and the outer-side circumferential surface 62 do not necessarily need to extend parallel with the axial direction of the peripheral wall 14b of the rotor housing 14, but may extend obliquely relative to the axial direction of the peripheral wall 14b of the rotor housing 14 and may be non-parallel with each other.

In the embodiment, the material of the seal member 50 is not limited to rubber as long as it is an elastic material.

In the embodiment, the drive rotor 20 and the driven rotor 21 may have a three-lobe shape or a four-lobe shape in a cross section perpendicular to the rotation axis r1 of the drive shaft 16 or the rotation axis r2 of the driven shaft 17.

In the embodiment, the drive rotor 20 and the driven rotor 21 may have helical shapes.

In the embodiment, the Roots pump 10 may be driven, for example, by an engine functioning as a drive source.

In the embodiment, the Roots pump 10 does not necessarily need to be used as a hydrogen pump for a fuel cell vehicle that supplies hydrogen to a fuel cell, but may be used for other purposes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A Roots pump comprising:
a rotary shaft that is rotated by a drive source;
a drive rotor that is driven by the rotary shaft;
a driven rotor that is driven in association with the drive rotor;
a housing unit that includes:
a rotor housing that accommodates the drive rotor and the driven rotor, the rotor housing including an end wall, through which the rotary shaft extends, and a peripheral wall, which extends from an outer periphery of the end wall; and
a cover member, which closes an opening of the rotor housing; and
a seal member, which is arranged between the rotor housing and the cover member, wherein
the peripheral wall includes a mating surface that faces the cover member,
the cover member includes a mating surface that faces the peripheral wall,
at least one of the mating surfaces includes an annular first groove,
the first groove includes a side surface on a radially inner side and a side surface on a radially outer side, the side surfaces facing each other,
the seal member is accommodated in the first groove,
the rotor housing includes a bulging portion, which is a part of the peripheral wall that bulges radially inward at a position between the drive rotor and the driven rotor, the bulging portion includes:
  a mating surface that faces the cover member; and
  a second groove, which is connected to the side surface on the radially inner side of the first groove,
the seal member includes:
  an annular seal body;
  first projections, which project from the seal body toward one of the side surface on the radially inner side or the side surface on the radially outer side of the first groove, the first projections being arranged at intervals in a circumferential direction of the seal body; and
  a second projection, which projects further radially inward from the seal body than the first projections,
each first projection includes a distal end that contacts one of the side surface on the radially inner side or the side surface on the radially outer side of the first groove, and
the second projection is arranged in the second groove so as to determine a position of the seal body in the first groove.

2. The Roots pump according to claim 1, wherein
the second projection includes:
  a projection distal end; and
  a connecting portion, which connects the projection distal end to the seal body, and
at least the projection distal end is in contact with an inner surface of the second groove.

3. The Roots pump according to claim 1, wherein
the second projection includes:
  a projection distal end; and
  a connecting portion, which connects the projection distal end to the seal body, and
the projection distal end is separated from an inner surface of the second groove, so that a gap is created between the projection distal end and the inner surface of the second groove.

4. The Roots pump according to claim 1, wherein
an inner circumferential surface of the peripheral wall includes:
  a first guiding surface, which extends semi-circularly about a rotation axis of the drive rotor;
  a second guiding surface, which extends semi-circularly about a rotation axis of the driven rotor;
  a first arcuate surface, which is continuous with the first guiding surface to extend arcuately about the rotation axis of the drive rotor; and
  a second arcuate surface, which is continuous with the second guiding surface to extend arcuately about the rotation axis of the driven rotor, the second arcuate surface being connected to the first arcuate surface, and
the bulging portion is defined by the first arcuate surface and the second arcuate surface, and bulges further radially inward than remaining portions of the peripheral wall.

5. The Roots pump according to claim 1, wherein
the rotor housing includes a discharge port that connects a rotor chamber in the rotor housing to an outside of the housing unit, and
the discharge port extends through the bulging portion.

6. The Roots pump according to claim 5, wherein the bulging portion is arranged in an upper portion of the peripheral wall in a vertical direction.

7. The Roots pump according to claim 1, wherein
the seal body includes:
  an annular first contact portion and an annular second contact portion that are in contact with the peripheral wall; and
  an annular third contact portion and an annular fourth contact portion that are in contact with the cover member,
the first contact portion and the second contact portion are spaced apart from each other in a radial direction of the seal body, and
the third contact portion and the fourth contact portion are spaced apart from each other in the radial direction of the seal body.

8. The Roots pump according to claim 7, wherein
the seal body includes:
  an annular first groove formed between the first contact portion and the second contact portion; and
  an annular second groove formed between the third contact portion and the fourth contact portion.

9. The Roots pump according to claim 8, wherein
the seal body includes through-holes that connect the first groove and the second groove to each other, and
the through-holes are arranged at intervals in the circumferential direction of the seal body.

10. The Roots pump according to claim 9, wherein each of the through-holes is located in a region between two of the first projections that are adjacent to each other in the circumferential direction of the seal body.

* * * * *